(12) United States Patent
Hong et al.

(10) Patent No.: US 10,254,875 B2
(45) Date of Patent: Apr. 9, 2019

(54) DISPLAY DEVICE AND DRIVING METHOD FOR THE SAME

(71) Applicant: SAMSUNG DISPLAY CO., LTD., Yongin-si, Gyeonggi-Do (KR)

(72) Inventors: Won-Ki Hong, Suwon-si (KR); Jong Seo Lee, Yongin-si (KR)

(73) Assignee: SAMSUNG DISPLAY CO., LTD., Yongin-si, Gyeonggi-do (KR)

(*) Notice: Subject to any disclaimer, the term of this patent is extended or adjusted under 35 U.S.C. 154(b) by 576 days.

(21) Appl. No.: 14/844,349

(22) Filed: Sep. 3, 2015

(65) Prior Publication Data

US 2016/0246432 A1 Aug. 25, 2016

(30) Foreign Application Priority Data

Feb. 25, 2015 (KR) .......................... 10-2015-0026807

(51) Int. Cl.
| | |
|---|---|
| *G06F 3/041* | (2006.01) |
| *G06F 3/044* | (2006.01) |
| *G06F 1/16* | (2006.01) |
| *G09G 3/3266* | (2016.01) |
| *G09G 3/3275* | (2016.01) |

(52) U.S. Cl.
CPC .......... *G06F 3/0416* (2013.01); *G06F 1/1652* (2013.01); *G06F 3/044* (2013.01); *G06F 3/0412* (2013.01); *G09G 3/3266* (2013.01); *G09G 3/3275* (2013.01); *G06F 2203/04102* (2013.01); *G09G 2300/0426* (2013.01); *G09G 2310/021* (2013.01); *G09G 2310/0297* (2013.01)

(58) Field of Classification Search
CPC ............................................ G06F 2203/04102
See application file for complete search history.

(56) References Cited

U.S. PATENT DOCUMENTS

| | | | | |
|---|---|---|---|---|
| 2012/0086651 A1* | 4/2012 | Kwon | ..................... | G06F 3/016 |
| | | | | 345/173 |
| 2013/0285970 A1 | 10/2013 | Ahn et al. | | |
| 2014/0320396 A1* | 10/2014 | Modarres | .............. | G06F 3/0412 |
| | | | | 345/156 |

FOREIGN PATENT DOCUMENTS

| | | |
|---|---|---|
| KR | 10-2009-0104192 A | 10/2009 |
| KR | 10-2010-0120423 A | 11/2010 |
| KR | 10-2014-0001392 A | 1/2014 |

\* cited by examiner

*Primary Examiner* — Amare Mengistu
*Assistant Examiner* — Shawna T Stepp Jones
(74) *Attorney, Agent, or Firm* — Lee & Morse P.C.

(57) ABSTRACT

A display device includes a flexible display panel, a sensing scan driver, and a sensing signal processor. The display panel includes a plurality of flexible touch input electrodes arranged in a first direction and a plurality of flexible touch output electrodes arranged in a second direction. The sensing scan driver supplies sensing input signals to the flexible touch input electrodes. The sensing signal processor receives sensing output signals through the flexible touch output electrodes. The display panel includes a plurality of touch sensing areas. One of the touch input electrodes and a pair of the touch output electrodes correspond to one of the touch sensing areas when the display panel stretches in the first direction by a predetermined first threshold value or more.

21 Claims, 19 Drawing Sheets

DISPLAY DEVICE AND DRIVING METHOD FOR THE SAME

CROSS-REFERENCE TO RELATED APPLICATION

Korean Patent Application No. 10-2015-0026807, filed on Feb. 25, 2015, and entitled: "Display Device and Driving Method for Display Device Using the Same," is incorporated by reference herein in its entirety.

BACKGROUND

1. Field

One or more embodiments described herein relate to a display device and a method for driving a display device.

2. Description of the Related Art

A variety of flat panel displays have been developed. Examples include a liquid crystal display, an organic light emitting diode (OLED) display, and an electrophoretic display. Each pixel of these displays has a field generating electrode and an electro-optical active layer. For example, each pixel of an OLED display has an electro-optical active layer including an organic emission layer, and a field generating electrode is connected to a switching element to receive a data signal. The data signal is converted by the electro-optical active layer to an optical signal to emit light to form an image.

One type of OLED display includes a touch sensor that detects an object approaching or contacting a screen. The touch is detected by sensing, for example, a change in pressure, charge, or light on the screen. This change may be caused, for example, when a user writes text or draws a figure on the screen using a finger or touch pen. When this occurs, an image signal is generated based on touch information.

A capacitive touch sensor includes a plurality of touch electrodes for transferring sensing signals. The touch electrodes may be a mutual-capacitor type or self-capacitor type. When an object approaches or contacts the touch sensor, a change in capacitance or charging amount of the sensing capacitor is generated to sense the touch.

The touch electrodes are disposed in a touch sensing area and connected to touch wires for transferring sensing signals. The touch wires may be inside the touch sensing area and in a non-sensing area around the touch sensing area. The touch wires may transfer sensing input signals to the touch electrodes or transfer sensing output signals generated according to a touch to a touch driver.

The touch sensor may be embedded in the display device (in-cell type), directly formed on an outer surface of the display device (on-cell type), or used by attaching a separate touch sensor unit to the display device (add-on cell type).

A display device having a touch sensor may include a glass substrate. Such a substrate is heavy and fragile and therefore limits portability and is unsuitable for forming a large-screen display. Accordingly, efforts have been made to replace the glass substrate with a plastic substrate, which is lighter, flexible, and able to endure stronger impact. However, when a flexible display stretches, problems may occur, e.g., a malfunction may occur due to a reduction in resolution of the touch sensor. As a result, it may be very difficult to accurately sense a touch under these conditions.

SUMMARY

In accordance with one or more embodiments, a display device includes a flexible display panel including a plurality of flexible touch input electrodes arranged in a first direction and a plurality of flexible touch output electrodes arranged in a second direction; a sensing scan driver to supply a plurality of sensing input signals to the flexible touch input electrodes; and a sensing signal processor to receive a plurality of sensing output signals through the flexible touch output electrodes, wherein the display panel includes a plurality of touch sensing areas, and wherein one of the touch input electrodes and a pair of the touch output electrodes correspond to one of the touch sensing areas when the display panel stretches in the first direction by a predetermined first threshold value or more.

One of the touch output electrodes and a pair of the touch input electrodes may correspond to one of the touch sensing areas when the display panel stretches in the second direction by a predetermined second threshold value or more.

The sensing scan driver may apply a test voltage to the touch input electrodes to generate a first stretch signal, the first stretch signal providing an indication of a change amount of a resistance value of each of the touch input electrodes, the sensing signal processor may generate a second stretch signal, the second stretch signal to provide an indication of a change amount of a resistance value of each of the touch output electrodes, and the display device may include a signal controller to determine lengths to which the touch panel stretches in the first direction and the second direction based on the first stretch signal and the second stretch signal.

The touch output electrodes may include a first touch output electrode and a second touch output electrode, and the display device may include a first sensing output signal line and a second sensing output signal line connected to the first touch output electrode and the second touch output electrode, respectively; a first switch circuit connected to the first sensing output signal line and the second sensing output signal line, the touch input electrodes including a first touch input electrode and a second touch input electrode, a first sensing input signal line and a second sensing input signal line connected to the first touch input electrode and the second touch input electrode, respectively; and a second switch circuit connected to the first sensing input signal line and the second sensing input signal line.

The first switch circuit may include a third sensing output signal line connecting the first sensing output signal line and the second sensing output signal line; a first switch connecting the third sensing output signal line; and a plurality of second switches connecting the first sensing output signal line and the second sensing output signal line, respectively, and the second switch circuit may include a third sensing input signal line connecting the first sensing input signal line and the second sensing input signal line; a third switch connecting the third sensing input signal line; and a plurality of fourth switches connecting the first sensing input signal line and the second sensing input signal line, respectively, the first to fourth switches to perform a switching operation according to a switching control signal of the signal controller.

When the controller determines that the display panel stretches in the first direction by less than the first threshold value or stretches in the second direction by less than the second threshold value, the first switch circuit may control the switching operation so that the first switch is turned off and the second switches are turned on, and the second switch circuit may control the switching operation so that the third switch is turned off and the fourth switches are turned on.

The first switch circuit may apply a sensing output signal to the first sensing output signal line and the second sensing output signal line at a first time, and the second switch circuit may apply a sensing input signal to the first sensing input signal line and the second sensing input signal line at the first time.

When the controller determines that the display panel stretches in the first direction by the first threshold value or more, the first switch circuit may control the switching operation so that the first switch is turned off and the second switches are turned on, and the second switch circuit may control the switching operation so that the third switch is turned on and the fourth switches are turned off.

The first switch circuit may apply a sensing output signal to the first sensing output signal line at a first time and the sensing output signal to the second sensing output signal line at a second time, and the second switch circuit may apply a sensing input signal to the first sensing input signal line and the second sensing input signal line at the first time.

When the controller determines that the display panel stretches in the second direction by the second threshold value or more, the first switch circuit may control the switching operation so that the first switch is turned off and the second switches are turned on, and the second switch circuit may control the switching operation so that the third switch is turned on and the fourth switches are turned off.

The first switch circuit may apply a sensing output signal to the first sensing output signal line and the second sensing output signal line at a first time, and the second switch circuit may apply a sensing input signal to the first sensing input signal line at the first time and the sensing input signal to the second sensing input signal line at a second time.

When the controller determines that the display panel stretches in the first direction and the second direction by the first threshold value and the second threshold value or more, respectively, the first switch circuit may control the switching operation so that the first switch is turned on and the second switches are turned off, and is to apply a sensing output signal to the first sensing output signal line at a first time and the sensing output signal to the second sensing output signal line at a second time, and the second switch circuit may control the switching operation so that the third switch is turned on and the fourth switches are turned off, and is to apply a sensing input signal to the first sensing input signal line at the first time and the sensing input signal to the second sensing input signal line at a second time.

The display device may include a first pixel connected to a first scan line and a first data line, a second pixel connected to a second scan line and a second data line, a display scan driver to apply corresponding scan signals to the first scan line and the second scan line, and a data driver to apply corresponding data signals to the first data line and the second data line, wherein: when the display panel stretches in the first direction by the first threshold value or more, the display scan driver is to apply a same scan signal to the first scan line and the second scan line, when the display panel stretches in the second direction by the second threshold value or more, the data driver is to apply a same data signal to the first data line and the second data line.

In accordance with one or more other embodiments, a method is provided for driving a display device, including a flexible display panel including a plurality of touch sensing areas, a plurality of flexible touch input electrodes arranged in a first direction and a plurality of flexible touch output electrodes arranged in a second direction, a sensing scan driver supplying a plurality of sensing input signals to the plurality of flexible touch input electrodes, a sensing signal processor receiving a plurality of sensing output signals through the plurality of flexible touch output electrodes, and a signal controller, the display panel divided into a plurality of touch sensing areas, and when the display panel stretches in the first direction by a predetermined first threshold value or more, one touch input electrode and a pair of touch output electrodes correspond to the touch sensing area.

The method includes applying a test voltage to the touch input electrodes to generate a first stretch signal providing an indication of a change amount of a resistance value of each of the touch input electrodes; applying a test voltage for generating a second stretch signal providing an indication of a change amount of a resistance value of each of the touch output electrodes; and determining lengths to which the touch panel stretches in the first direction and the second direction based on the first stretch signal and the second stretch signal.

One of the touch output electrodes of the pair of touch output electrodes may correspond to the touch sensor and the pair of touch input electrodes corresponds to the touch sensor when the display panel stretches in a second direction by a predetermined second threshold value or more. The touch output electrodes may include a first touch output electrode and a second touch output electrode, the display device includes a first sensing output signal line and a second sensing output signal line connected to the first touch output electrode and the second touch output electrode, respectively, and a first switch circuit connected to the first sensing output signal line and the second sensing output signal line, the touch input electrodes includes a first touch input electrode and a second touch input electrode, the display device includes a first sensing input signal line and a second sensing input signal line connected to the first touch input electrode and the second touch input electrode, respectively; and a second switch circuit connected to the first sensing input signal line and the second sensing input signal line.

The first switch circuit may include a third sensing output signal line connecting the first sensing output signal line and the second sensing output signal line, a first switch connecting the third sensing output signal line, and a plurality of second switches connecting the first sensing output signal line and the second sensing output signal line, respectively, and the second switch circuit may include a third sensing input signal line connecting the first sensing input signal line and the second sensing input signal line, a third switch connecting the third sensing input signal line, and a plurality of fourth switches connecting the first sensing input signal line and the second sensing input signal line, respectively, the first to fourth switches perform a switching operation according to a switching control signal of the signal controller.

When the display panel does not stretch or stretches in a first direction or a second direction by less than the predetermined length, the switching operation may include controlling the switching operation so that the first switch is turned off and the second switches are turned on; and controlling the switching operation so that the third switch is turned off and the fourth switches are turned on.

The method may include applying a sensing output signal to the first sensing output signal line and the second sensing output signal line at a first time; and applying a sensing input signal to the first sensing input signal line and the second sensing input signal line at the first time.

When the display panel stretches in the first direction by the predetermined length, the switching operation may include controlling the switching operation so that the first switch is turned off and the second switches are turned on and controlling the switching operation so that the third switch is turned on and the fourth switches are turned off, and when the display panel stretches in the second direction by the predetermined length, the switching operation may include controlling the switching operation so that the first switch is turned off and the second switches are turned on and controlling the switching operation so that the third switch is turned on and the fourth switches are turned off.

The display device may include a first pixel connected to a first scan line and a first data line; a second pixel connected to a second scan line and a second data line; a scan driver to apply corresponding scan signals to the first scan line and the second scan line, and a data driver to apply corresponding data signals to the first data line and the second data line, wherein the method may include: when the display panel stretches in the first direction by the first threshold value or more, applying a same scan signal from the scan driver to the first scan line and the second scan line; and when the display panel stretches in the second direction by the second threshold value or more, applying a same data signal from the data driver to the first data line and the second data line.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
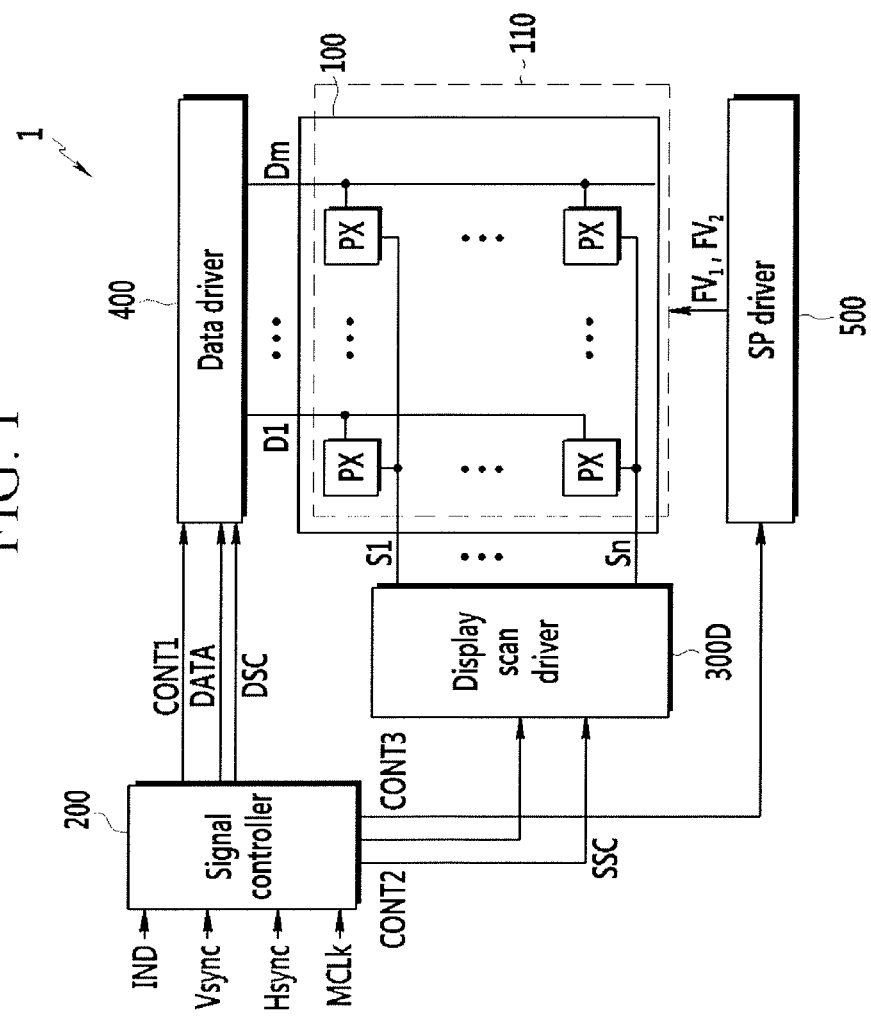
FIGS. 1 and 2 illustrate an embodiment of a display device.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it may be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

It should be understood that, when it is described that an element is "coupled" or "connected" to another element, the element may be "directly coupled" or "directly connected" to the another element or "coupled" or "connected" to the another element through a third element. In contrast, it should be understood that, when it is described that an element is "directly coupled" or "directly connected" to another element, it is understood that no element is present between the element and another element.

Figure 2:
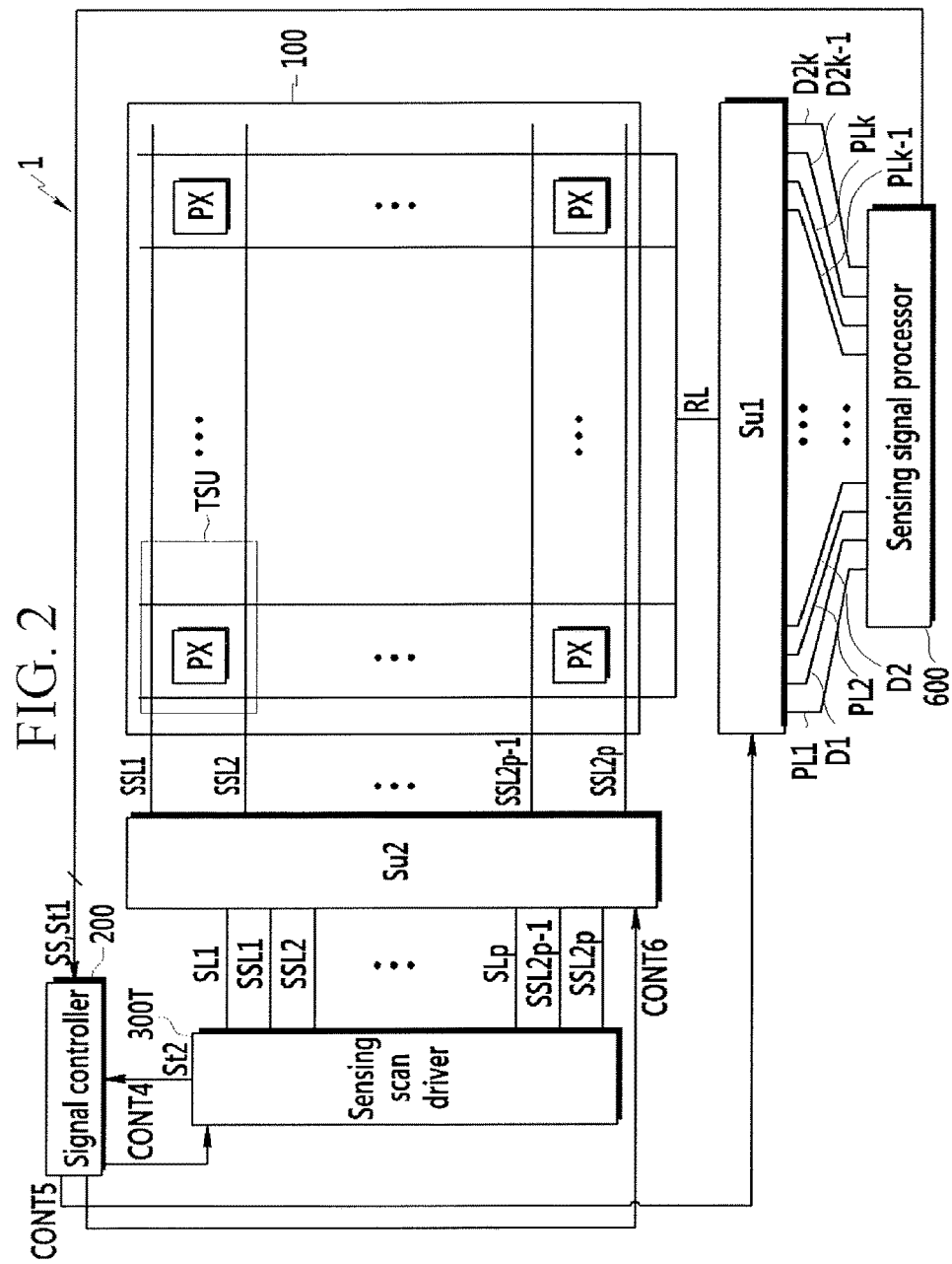

FIGS. 1 and 2 illustrate an embodiment of a display 1 which includes a plurality of scan lines S1-Sn, a plurality of data lines D1-Dm, a plurality of first sensing input signal lines SL1-SLp, a plurality of second sensing input signal lines SSL1-SSL2p, a plurality of first sensing output signal lines PL1-PLk, a plurality of second sensing output signal lines SPL1-SPL2k, a display panel 100, a smart fluid panel 110, a signal controller 200, a display scan driver 300D, a sensing scan driver 300T, a data driver 400, an SP driver 500, a sensing signal processor 600, a first switch unit Su1, and a second switch unit Su1.

As illustrated in FIG. 1, the scan lines S1-Sn (n is a natural number) are arranged in a first (e.g., vertical) direction and extend in a second (e.g., horizontal) direction. The data lines D1-Dm (m is a natural number) are arranged in the horizontal direction and extend in the vertical direction.

The display panel 100 includes a plurality of pixels PX connected to the scan lines S1-Sn and the data lines D1-Dm and arranged substantially in a matrix form. The display panel 100 is a flexible display panel including a touch panel.

The smart fluid panel 110 is below the display panel 100. The smart fluid panel 110 has a rigid or flexible property based on fluid driving voltages FV1 and FV2. The smart fluid panel 110 includes a smart fluid pocket.

The display scan driver 300D is connected to the scan lines S1-Sn and sequentially applies scan signals S[1]-S[n] to the scan lines S1-Sn according to a display scan control signal CONT2.

The data driver 400 is connected to the data lines D1-Dm and generates data signals (for example, data voltages) corresponding to image data DATA input according to a data driving control signal CONT1.

The signal controller 200 receives external input data InD and a synchronization signal and generates a data signal switch control signal DSC, a data driving control signal CONT1, a scan signal switch control signal SSC, a display scan control signal CONT2, a smart fluid driving control signal CONT3, a sensing scan control signal CONT4, a first switch control signal CONT5, a second switch control signal CONT6, and image data DATA. The external input data InD store luminance information of each pixel PX and the luminance has a predetermined number, for example, 1024 ($=2^{10}$), 256 ($=2^8$), or 64 ($=2^6$) of grayscale values. The synchronization signal includes a horizontal synchronization signal Hsync, a vertical synchronization signal Vsync, and a main clock signal MCLK.

The signal controller 200 divides the external input data InD by a frame unit according to the vertical synchronization signal Vsync. In addition, the signal controller 200 generates the image data DATA by dividing the external input data InD by a scan line unit according to the horizontal synchronizing signal Hsync.

The signal controller 200 generates a smart fluid driving control signal CONT3 according to a first stretch signal St1 and a second stretch signal St2. When it is determined that the display panel 100 stretches by a predetermined length (for example, two times in the vertical direction) based on the first stretch signal St1, the signal controller 200 generates a smart fluid driving control signal CONT3 so that the smart fluid panel 110 has a rigid property. When it is determined that the display panel 100 stretches by less than the predetermined length based on the first stretch signal St1, the signal controller 200 generates the smart fluid driving control signal CONT3 so that the smart fluid panel 110 has a flexible property.

Further, when it is determined that the display panel 100 stretches by a predetermined length (for example, two times in a horizontal direction) based on a second stretch signal St2, the signal controller 200 generates the smart fluid driving control signal CONT3 so that the smart fluid panel 110 has a rigid property. When it is determined that the display panel 100 stretches by less than the predetermined length based on the second stretch signal St2, the signal controller 200 generates the smart fluid driving control signal CONT3 so that the smart fluid panel 110 has a flexible property.

The SP driver 500 applies fluid driving voltages FV1 and FV2 to the smart fluid panel 110 according to the smart fluid driving control signal CONT3. The SP driver 500 applies the first fluid driving voltage FV1 to the smart fluid panel 110 to allow the smart fluid panel 110 to have a flexible property. The SP driver 500 applies the second fluid driving voltage FV2 to the smart fluid panel 110 to allow the smart fluid panel 110 to have a rigid property.

The pixel PX displays a desired color of light in a spatial or temporal sum of predetermined (e.g., primary) colors. Each pixel PX may uniquely display (spatial division) one of the primary colors or a plurality of pixels PX may alternately display (temporal division) the primary colors over time. The pixel PX synchronizes with the corresponding scan signal to receive a data signal from a corresponding data line. The data signal input to the pixel PX is written in the pixel PX according to the scan signal supplied through the scan line.

As illustrated in FIG. 2, the display panel 100 includes a plurality of pixels PX connected to a plurality of second sensing input signal lines SSL1-SSL2$p$ and second sensing output signal lines SPL1-SPL2$k$. The pixels PX are arranged in a matrix form. The display panel 100 also includes a plurality of touch sensing areas TSU.

The first sensing input signal lines SL1-SL$p$ (p is a natural number) and the second sensing input signal lines SSL1-SSL2$p$ are arranged in the vertical direction. The first input signal lines SL1-SL$p$ and the second sensing input signal lines SSL1-SSL2$p$ extend in the horizontal direction. The first input signal lines SL1-SL$p$ and the second sensing input signal lines SSL1-SSL2$p$ connect the sensing scan driver 300T and the second switch unit Su2. The first input signal lines SL1-SL$p$ and the second sensing input signal lines SSL1-SSL2$p$ are connected to the sensing scan driver 300T and may extend substantially in parallel with each other. The first input signal lines SL1-SL$p$ and the second sensing input signal lines SSL1-SSL2$p$ transfer a sensing input signal from the sensing scan driver 300T to the second switch unit Su2. The sensing input signal may have various waveforms and voltage levels.

The touch sensing areas TSU are connected with a sensing signal line RL, and the sensing signal line RL is connected to the first switch unit Su1. A sensing output signal generated from the touch sensing area TSU according to a touch on the display panel 100 may be applied to the sensing signal line RL. The first sensing output signal lines PL1-PL$k$ and the second sensing output signal lines SPL1-SPL2$k$ connect the first switch unit Su1 and the sensing signal processor 600.

The first switch unit Su1 switches between the sensing signal line and the first sensing output signal lines PL1-PL$k$ or the second sensing output signal lines SPL1-SPL2$k$ according to the first switch control signal CONT5. The first switch unit Su1 performs a switching operation so that the sensing output signal is connected with the first sensing output signal lines PL1-PL$k$ and the second sensing output signal lines SPL1-SPL2$k$ which correspond to the sensing signal line RL. The first switch unit Su1 may be implemented, for example, by a demultiplexer. The second switch unit Su2 controls the switching operation according to a second switch control signal CONT6. The second switch unit Su2 performs the switching operation so that the sensing input signal is applied to the first sensing input signal lines SL1-SL$p$ or the second sensing input signal lines SSL1-SSL2$p$.

The sensing scan driver 300T applies the sensing input signal (e.g., sensing input voltage) to the first sensing input signal lines SL1-SL$p$ or the second sensing input signal lines SSL1-SSL2$p$ according to a sensing scan control signal CONT4. In this case, application of the sensing input signal may be sequentially performed. The sensing scan driver 300T applies a test voltage to the first sensing input signal lines SL1-SL$p$ or the second sensing input signal lines SSL1-SSL2$p$ to generate a second stretch signal St2, which provides an indication of the degree to which the display panel 100 stretches in the horizontal direction.

The sensing signal processor 600 generates a sensing signal SS, in which touch information such as existence of a touch and a touch position of the touch sensing area TSU, based on the sensing output signal inputted through the sensing signal line RL. The sensing signal processor 600 includes a multiplexer and generates the sensing signal SS including a position of the touch sensing area TSU through the multiplexer.

The sensing signal processor 600 generates the first stretch signal St1 which provides an indication of the degree to which the display panel 100 stretches in the vertical direction. The first stretch signal St1 is generated based on the test voltage inputted through the first sensing output signal lines PL1-PL4 and the second sensing output signal lines SPL1-SPL8. The sensing signal processor 600 applies the test voltage to the first sensing output signal lines PL1-PL$k$ or the second sensing output signal lines SPL1-SPL2$k$ to generate the first stretch signal St1.

In FIG. 2, for convenience of description, the sensing scan driver 300T and the sensing signal processor 600 are illustrated as separate constituent elements. In another embodiment, the sensing scan driver 300T may be included in the sensing signal processor 600. Further, the sensing signal processor 600 is illustrated to be separate from the signal controller 200. In another embodiment, the sensing signal processor 600 may be included in the signal controller 200.

The touch sensing areas TSU are connected to corresponding second sensing input signal lines SSL1-SSL2$p$ and corresponding second sensing output signal lines SPL1-SPL2$k$. The pixels PX are arranged in a matrix form. The touch sensing areas TSU detect a touch, e.g., from a user using any type of pointing tool including but not limited to a part of a user's body (for example, a finger) and a stylus. The touch sensing area TSU generates a sensing output signal according to a touch based on capacitance.

As illustrated in FIG. 2, one touch sensing area TSU may be positioned, for example, at a portion where two second sensing input signal lines SSL1 and SSL2 and two second sensing output signal lines SPL1 and SPL2 cross each other. The panel 100 may stretch in the horizontal and/or vertical direction. The number of corresponding sensing input signal lines and sensing output signal lines may be varied in different embodiments. The length of one side of the touch sensing area TSU may be approximately several mm, for example, approximately 4 to 5 mm. The size of the touch sensing area TSU may be varied in different embodiments, for example, according to a touch area when an object touches the display panel 100.

Further, the pixels PX may be positioned in one touch sensing area TSU. For example, tens or hundreds of pixel PX columns may be disposed in a row direction or a column direction in one touch sensing area TSU. The density of pixels PX corresponding to one touch sensing area TSU may be different in another embodiment.

Figure 4:
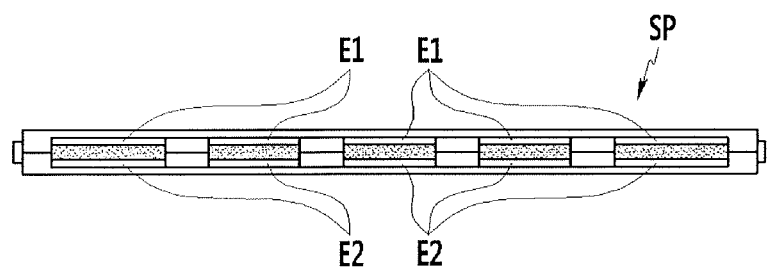
FIGS. 4 and 5 illustrate examples of shapes of the smart fluid pocket.
Figure 5:
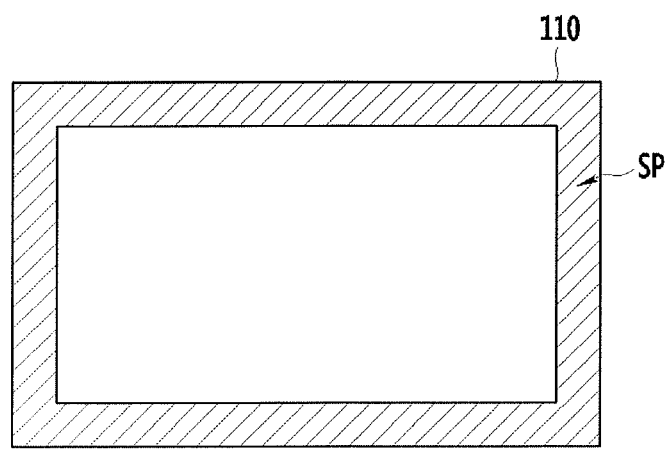

FIGS. 3(a)-3(e) illustrating different stages in one embodiment of a method for manufacturing the smart fluid pocket SP. FIGS. 4 and 5 illustrating examples of shapes of the smart fluid pocket SP.

The smart fluid pocket SP may include an electro-rheological fluid (ER) or a magneto-rheological fluid (MR). The ER is a colloid solution in which strong conductive particles are dispersed in a non-conductive solvent. The MR is a colloid solution in which paramagnetic particles are dispersed in a solvent having low permeability. An example of characteristics of the MR and the ER are illustrated in Table 1 below.

TABLE 1

|  | ER Fluid | MR Fluid |
| --- | --- | --- |
| Expression sense | Hardness | |
| Fluid driving voltage (V) | <100 V | 5 V |
| Power consumption (mV) | Tens | Tens or more |
| Performance (Kpa) | Several KPa | Several KPa |
| Transparency | 85% | Opaque (∵Iron) |
| Response speed | Several ms | Several ms |
| Thickness | <100 um | <100 um |
| Drawback | High voltage | Requiring coil |
| Usage | | Widely used for a vehicle damper |

The smart fluid pocket SP has a characteristic of which mechanical properties (e.g., viscosity, elasticity, and the like) of the fluid are changed by an electric field or a magnetic field. The smart fluid pocket SP includes fluid particles. When a first fluid driving voltage Fv1 (for example, 0 V) is applied to the smart fluid pocket SP, the fluid particles freely move in a Newtonian fluid state. When the second fluid driving voltage FV2 is applied to the smart fluid pocket SP, the fluid particles have yield stress by forming a chain structure in which the fluid particles are vertical to the electrode in a Bingham fluid state. Accordingly, the smart fluid panel 110 has a flexible property according to the first fluid driving voltage FV1 and has a rigid property according to the second fluid driving voltage FV2.

Figure 3:
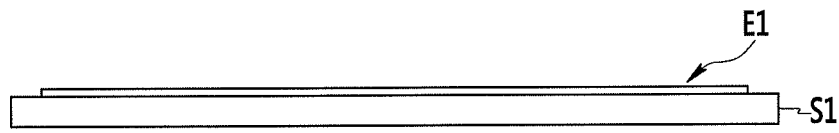
FIGS. 3(a)-3(f) illustrate a method for manufacturing a smart fluid pocket.
Figure 3:
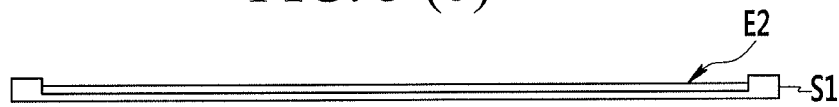
Figure 3:
Figure 3:
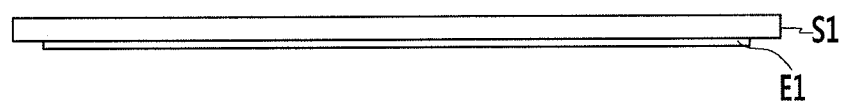
Figure 3:
Figure 3:
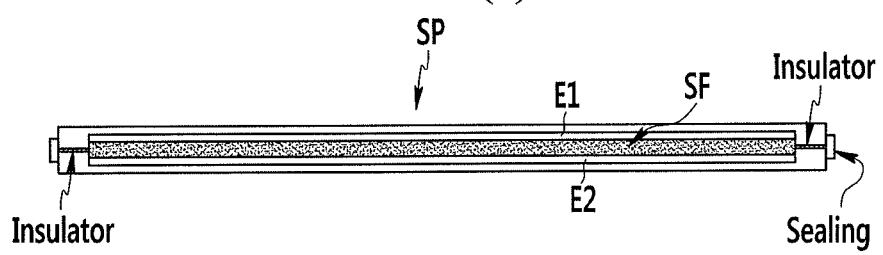

In the method for manufacturing the smart fluid pocket SP, in FIG. 3(a), a plate electrode E1 is formed on a first flexible plastic substrate S1. In FIG. 3(b), a second flexible plastic substrate S2 is etched with a predetermined depth, and a plate electrode E2 is formed inside the second flexible plastic substrate S2. In FIG. 3 (c), a smart fluid SF is injected onto the second flexible plastic substrate S2. The smart fluid SF may be the MR or the ER. In the case of MR, a predetermined pattern (for example, an annual-ring-shaped pattern) may be formed on the first plastic substrate S1 or the second plastic substrate S2.

In FIGS. 3(d) & 3(e), the first plastic substrate S1 with the plate electrode E1 and the second flexible plastic substrate S2, in which the smart fluid SF is injected onto the plate electrode E2, are attached to each other with the smart fluid SF therebetween. According to this arrangement, the first plastic substrate S1 and the second plastic substrate S2 face each other. The first plastic substrate S1 and the second plastic substrate S2 are insulated from each other, with an insulator at a portion where the first plastic substrate S1 and the second plastic substrate S2 contact each other. In FIG. 3(f), ends of the first plastic substrate S1 and the second plastic substrate S2 are sealed.

Referring to FIG. 4, the smart fluid pocket SP forms a cell to correspond to a pixel PX or a touch sensing area TSU to be included in the smart fluid panel 110. Referring to FIG. 5, in one embodiment, the smart fluid pocket SP may be formed at only an edge of the smart fluid panel 110.

Figure 6:
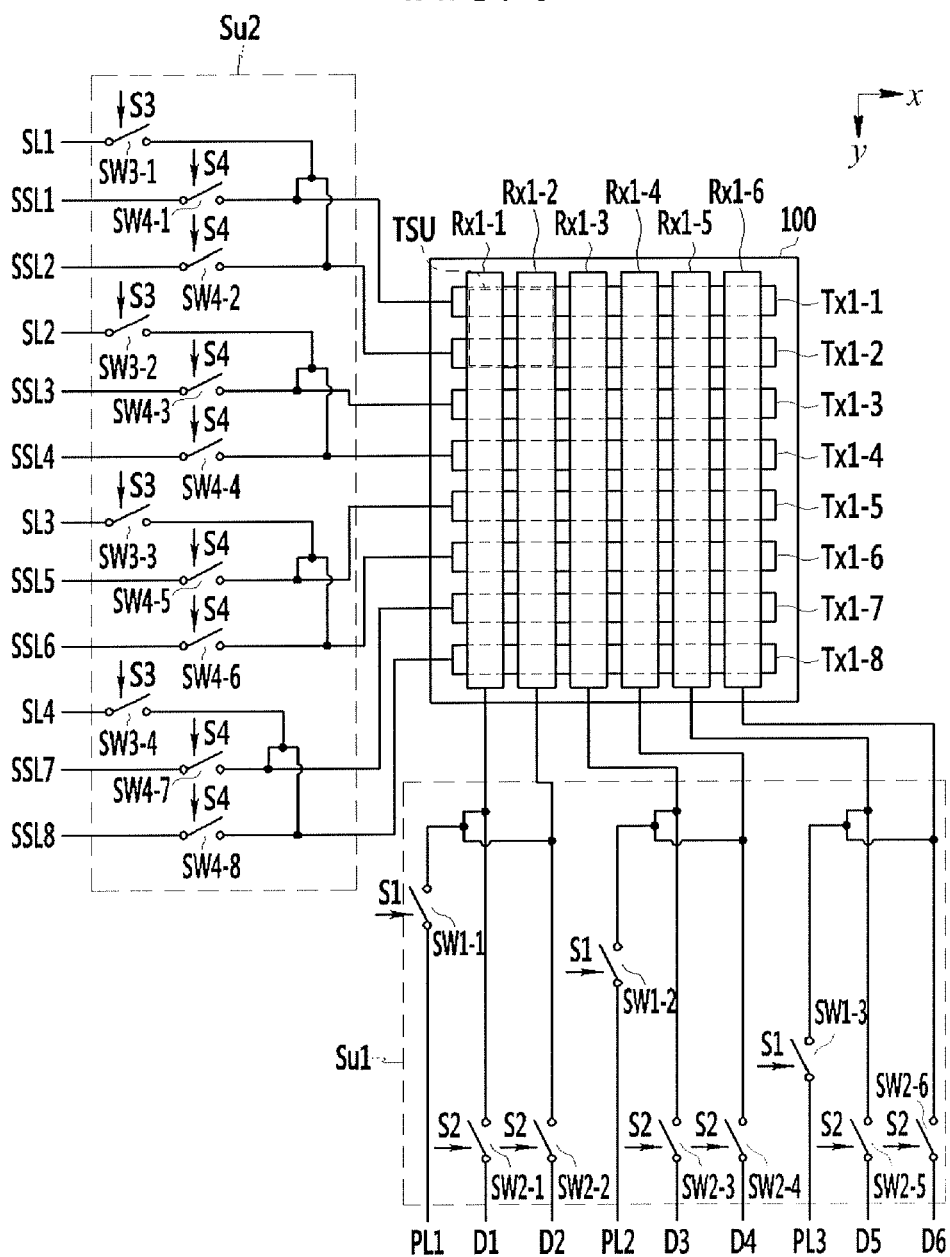
FIG. 6 illustrates an embodiment of a display panel in a normal state.

FIG. 6 illustrates a display panel 100, a first switch unit Su1, and a second switch unit Su2 according to one embodiment. In FIG. 6, the display panel 100 is not in a stretched state. For convenience of description, the first sensing output signal lines PL1-PLk and the second sensing output signal lines SPL1-SPL2k are illustrated to be connected to the sensing output electrodes, respectively. As illustrated in FIG. 2, the first sensing output signal lines PL1-PLk and the second sensing output signal lines SPL1-SPL2k are connected to the sensing signal line RL by a switching operation of the first switch unit Su1. Four first sensing input signal lines SL1-SL4, eight second sensing input lines SSL1-SSL8, eight sensing input electrodes Tx, and six sensing output electrodes Rx are illustrated. The numbers of these lines and/or electrodes may be different in another embodiment.

The display panel 100 includes a plurality of sensing input electrodes Tx1-1 to Tx1-8 and a plurality of sensing output electrodes Rx1-1 to Rx1-8. The sensing input electrodes Tx1-1 to Tx1-8 may be arranged in a matrix form. The sensing input electrodes Tx1-1 to Tx1-8 are arranged in the column direction and form one sensing input electrode column. The sensing input electrodes Tx1-1 to Tx1-8 are arranged in the row direction and form one sensing input electrode row. The sensing input electrodes Tx1-1 to Tx1-8 in one sensing input electrode column may be connected to each other.

The sensing output electrodes Rx1-1 to Rx1-6 in the column direction and the sensing output electrodes Rx1-1 to Rx1-6 in the row direction may be disposed at predetermined intervals.

The shapes of the sensing input electrodes Tx1-1 to Tx1-8 and the sensing output electrodes Rx1-1 to Rx1-6 may be quadrangles as illustrated in FIG. 6. However, these shapes may be different in another embodiment. The lengths of one or more sides of the sensing input electrodes Tx1-1 to Tx1-8 and the sensing output electrodes Rx1-1 to Rx1-6 may be approximately several mm. These lengths may be different in another embodiment based, for example on a size of a touch object and/or a touch method.

The sensing input electrodes Tx1-1 to Tx1-8 and the sensing output electrodes Rx1-1 to Rx1-6 are positioned on different layers in a cross-sectional structure of the display panel 100. Some of these electrodes may overlap. In one embodiment, the sensing input electrodes Tx1-1 to Tx1-8 and the sensing output electrodes Rx1-1 to Rx1-6 may be positioned on the same plane. The sensing output electrodes Rx1-1 to Rx1-6 and the sensing input electrodes Tx1-1 to Tx1-8 may be made of transparent conductive materials, e.g., indium tin oxide (ITO) or indium zinc oxide (IZO). The sensing input electrodes Tx1-1 to Tx1-8 and the sensing output electrodes Rx1-1 to Rx1-8 may stretch in a first direction (x direction) and/or a second direction (y direction).

The sensing input electrodes Tx1-1 to Tx1-8 are electrically connected with corresponding second sensing input signal lines SSL1-SSL8. The sensing output electrodes Rx1-1 to Rx1-6 are electrically connected with corresponding second sensing output signal lines SPL1-SPL6.

The first sensing input signal lines SL1-SL4, the second sensing input signal lines SSL1-SSL8, the first sensing output signal lines PL1-PL3, and the second sensing output signal lines SPL1-SPL6 may include conductive materials, for example, having lower resistance than the sensing input electrodes Tx1-1 to Tx1-8 and the sensing output electrodes Rx1-1 to 1-6, e.g., a metal such as copper (Cu). In one embodiment, the first sensing input signal lines SL1-SL4, the second sensing input signal lines SSL1-SSL8, the first sensing output signal lines PL1-PL3, and the second sensing output signal lines SPL1-SPL6 may have a multilayered structure including two or more different conductive materials.

The sensing scan driver 300T applies the test voltage through the second sensing input signal lines SSL1-SSL8, calculates resistance of sensing input electrodes Tx1-1 to Tx1-8, and generates a first stretch signal SU including the calculated resistance value.

The signal controller 200 determines the degree to which the sensing input electrodes Tx1-1 to Tx1-8 stretch in the first direction (x direction) based on the first stretch signal St1. For example, the sensing scan driver 300T determines that the sensing input electrodes Tx1-1 to Tx1-8 stretch two times when the resistance of the sensing input electrodes Tx1-1 to Tx1-8 is increased by four times more than the resistance before stretching.

The sensing signal processor 600 applies the test voltage through the second sensing output signal lines SPL1-SPL6, calculates the resistance of the sensing output electrodes Rx1-1 to Rx1-6, and generates a second stretch signal St2 including the calculated resistance value of the sensing output electrodes.

The signal controller 200 determines the degree to which the sensing output electrodes Rx1-1 to Rx1-6 stretch in the second direction (y direction) based on the second stretch signal St2. In the signal controller 200, a method of calculating resistance of the output electrodes Rx1-1 to Rx1-6 may be the same as that of the aforementioned sensing scan driver 300T.

In the first switch unit Su1, a plurality of first switches Sw1-1 to Sw-4 corresponding to the first sensing input signal lines SL1-SL4 and a plurality of second switches Sw2-1 to Sw2-8 corresponding to the second sensing input signal lines SSL1-SSL8 are included. The first switch unit Su1 controls the switching operation according to a first switch control signal CONT5. A first switch control signal S1 and a second switch control signal S2 are in the first switch control signal CONT5. For the first switches Sw1-1 to Sw1-4, a switching operation is controlled according to the first switch control signal S1.

When the first switches Sw1-1 to Sw1-3 are turned on according to the first switch control signal S1, two adjacent sensing output electrodes (for example, Rx1-1 and Rx1-2) among the sensing output electrodes Rx1-1 to Rx1-6 are connected with a first sensing output signal line (for example, PL1) corresponding to the sensing output electrodes, respectively. In the plurality of second switches Sw2-1 to Sw2-8, a switching operation is controlled according to the second switch control signal S2. When the second switches Sw2-1 to Sw2-6 are turned on according to the second switch control signal S2, the sensing output electrodes Rx1-1 to Rx1-6 and the second sensing output signal lines SPL1-SPL6 are connected to each other, respectively.

In the second switch unit Su2, a plurality of third switches Sw3-1 to Sw3-4 corresponding to the first sensing output signal lines PL1-PL4 and a plurality of fourth switches Sw4-1 to Sw4-8 corresponding to the second sensing output signal lines SPL1-SPL8 are included. In the second switch unit Su2, the switching operation is controlled according to a second switch control signal CONT6. A third switch control signal S3 and a fourth switch control signal S4 are in the second switch control signal CONT6. For the third switches Sw3-1 to Sw3-4, the switching operation is controlled according to the third switch control signal S3.

When the third switches Sw3-1 to Sw3-4 are turned on according to the third switch control signal S3, two adjacent sensing input electrodes (for example, Tx1-1 and Tx1-2) among the sensing input electrodes Tx1-1 to Tx1-8 are connected with a first sensing input signal line (for example, SL1) corresponding to the sensing input electrodes, respectively. For the fourth switches Sw4-1 to Sw4-8, the switching operation is controlled according to the fourth switch control signal S4. When the fourth switches Sw4-1 to Sw4-8 are turned on according to the fourth switch control signal S4, the sensing input electrodes Tx1-1 to Tx1-8 and the second sensing output signal lines SSL1-SSL8 are connected to each other, respectively.

The touch sensing area TSU may be formed at a dotted-line portion where two sensing output electrodes Rx1-1 and Rx1-2 and two sensing input electrodes Tx1-1 and Tx1-2 overlap each other. The number of corresponding sensing output electrodes and sensing input electrodes may be different in another embodiment. When a touch is applied to the touch sensing area TSU, the charge amount of a sensing capacitor of the touch sensing area TSU is changed. This change is reflected in the sensing output signal to generate the output sensing signal.

The touch sensing area TSU includes a sensing capacitor formed by overlapping the sensing output electrode Rx1-1 and the sensing input electrode Tx1-1 or the sensing output electrode Rx1-2 and the sensing input electrode Tx1-2. The sensing capacitor includes an overlap sensing capacitor formed by overlapping the sensing output electrode Rx1-1 and the sensing input electrode Tx1-1 or the sensing output electrode Rx1-2 and the sensing input electrode Tx1-2 or a fringe sensing capacitor adjacent to the sensing output electrode Rx1-1 and the sensing input electrode Tx1-1 or the sensing output electrode Rx1-2 and the sensing input electrode Tx1-2 without overlapping.

The touch sensing area TSU receives a sensing input signal, transferred by the second sensing input signal line SSL1 or the second sensing input signal line SSL2, to generate a change in the charge amount of a sensing capacitor Cm based on a touch of an external object as a sensing output signal. For example, when the sensing input signal is input to the touch sensing area TSU, the sensing capacitor Cm is charged with a predetermined charge amount, and the charge amount changed according to existence of a touch is output to the second sensing output signal line SPL1 or the second sensing output signal line SPL2 as the sensing output signal. For example, when the touch of the external object exists, the charge amount charged in the sensing capacitor Cm is changed, and thus the sensing output signal is output to the second sensing output signal line SPL1 or the second sensing output signal line SPL2. A voltage level of the sensing output signal when the object touches the display panel 100 may be smaller than a voltage level of the sensing output signal when the object does not touch the display panel 100.

Figure 7:
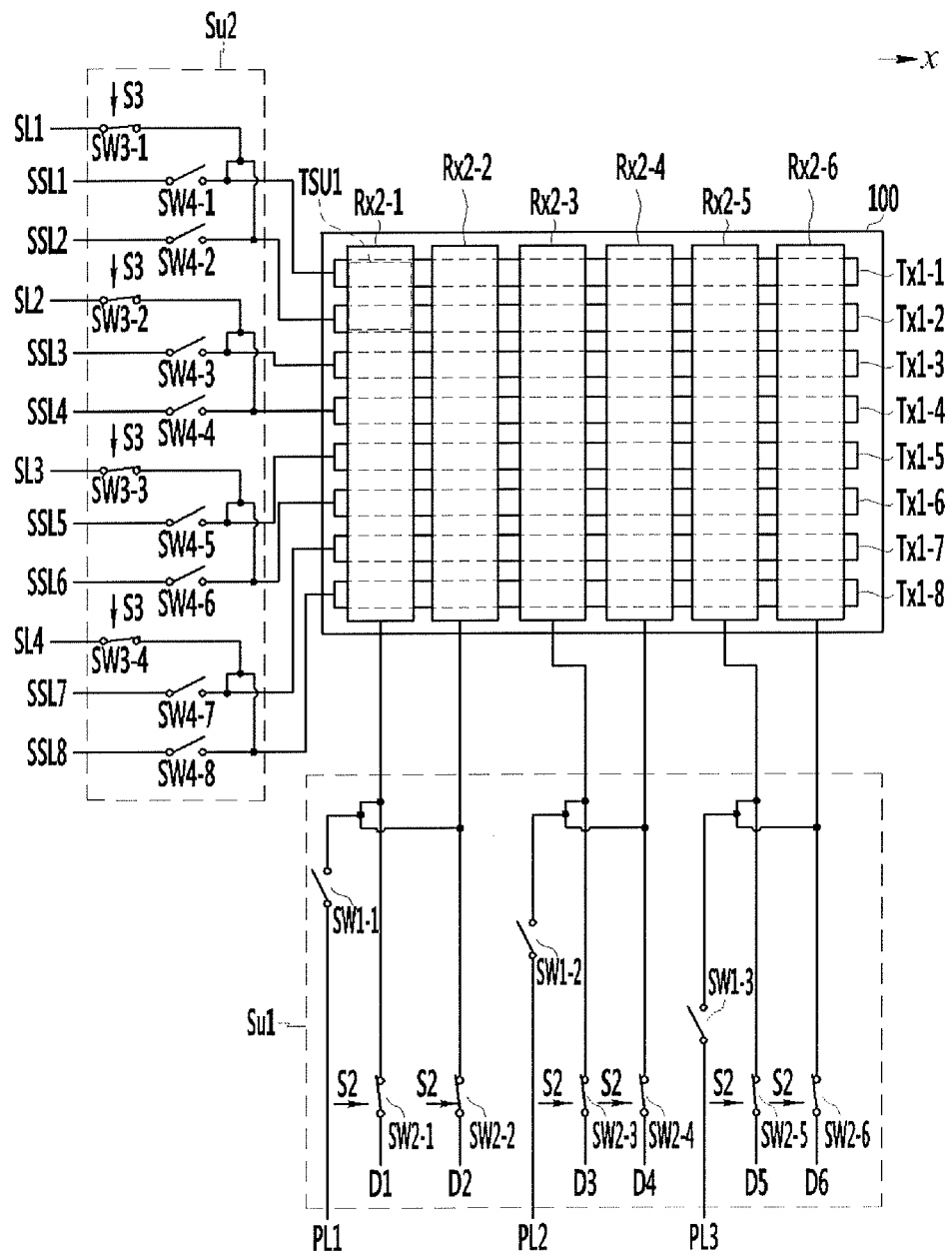
FIG. 7 illustrates an example of the display panel in a stretched state.

FIG. 7 illustrates an embodiment of the display panel 100, the first switch unit Su1, and the Su2 second switch stretched in the vertical direction. When stretched in this direction, sensing output electrodes Rx2-1 to Rx2-6 stretch in the first direction (x direction) as the display device stretches in the first direction (x direction) by a predetermined length. A touch sensing area TSU1 including a sensing capacitor may be formed at a dotted-line portion, where one sensing output electrode Rx2-1 and two sensing input electrodes Tx1-1 and Tx1-2 overlap each other.

The signal controller 200 determines that the display panel 100 stretches in the first direction (x direction) by a predetermined length and generates a smart fluid driving control signal CONT3 and a first switch control signal CONT5 to control the smart fluid panel 110 to have a rigid property. The SP driver 500 applies to the second fluid driving voltage FV2, according to the smart fluid driving control signal CONT3, to the smart fluid panel 110 to allow the smart fluid panel 110 to have a rigid property.

When the second switches Sw2-1 to Sw2-6 are turned on according to the second switch control signal S2, the sensing output electrodes Rx2-1 to Rx2-6 and the second sensing output signal lines SPL1-SPL6 are connected to each other, respectively.

When the third switches Sw3-1 to Sw3-3 are turned on according to the third switch control signal S3, respectively, two adjacent sensing input electrodes Tx1-1 and Tx1-2, sensing input electrodes Tx1-1 and Tx1-2, and sensing input electrodes Tx1-1 and Tx1-2 are connected to the first sensing input signal line SL1, the first sensing input signal line SL2, and the first sensing input signal line SL1, respectively.

Figure 8:
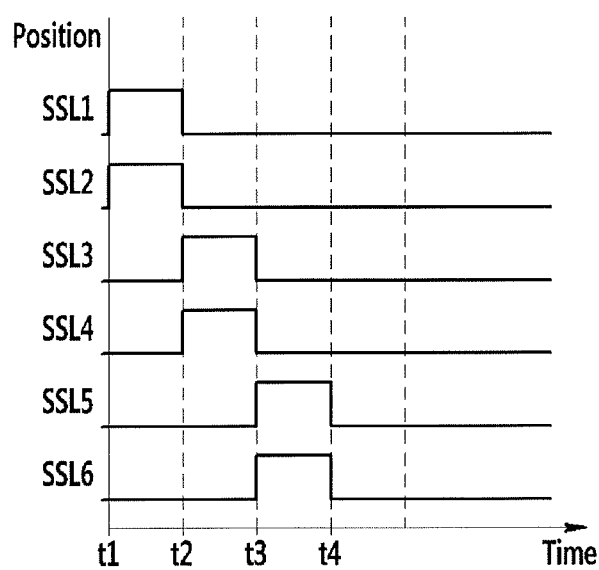
FIGS. 8 and 9 illustrate control signals for the display panel in FIG. 7.
Figure 9:
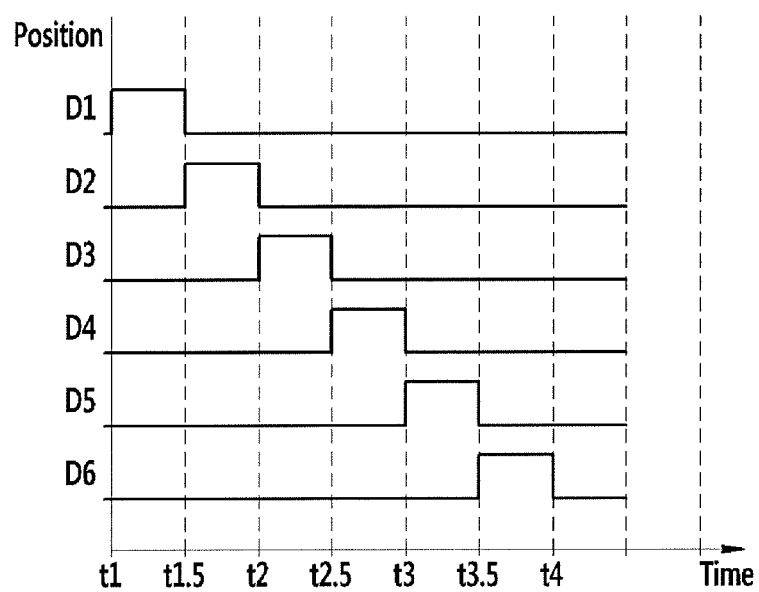

FIGS. 8 and 9 illustrate examples of a sensing input signal and a sensing output signal applied to the sensing input electrode and sensing output electrode in FIG. 7. A sensing operation when the display panel 100 according to the exemplary embodiment stretches in the horizontal direction will be described with reference to FIGS. 8 and 9.

Before time t1, the SP driver 500 applies the second fluid driving voltage FV2 to the smart fluid panel 110 to allow the smart fluid panel 110 to have a rigid property. At time t1, sensing input signals with the same level are applied to the second sensing input signal lines SSL1 and SSL2. Further, at the time t1, the sensing output signal is applied to the second sensing output signal line SPL1.

At time t1.5, the sensing output signal is applied to the second sensing output signal line SPL2.

At time t2, sensing input signals with the same level are applied to the second sensing input signal lines SSL3 and SSL4. Further, at the time t2, the sensing output signal is applied to the second sensing output signal line SPL3.

At time t2.5, the sensing output signal is applied to the second sensing output signal line SPL4.

At time t3, sensing input signals with the same level are applied to the second sensing input signal lines SSL5 and SSL6. Further, at the time t3, the sensing output signal is applied to the second sensing output signal line SPL5.

At time t3.5, the sensing output signal is applied to the second sensing output signal line SPL6.

Accordingly, when the display panel 100 stretches in the first direction (x direction), two adjacent sensing input electrodes among non-stretched sensing input electrodes Tx1-1 to Tx1-8 are driven by a pair and the stretched sensing output electrodes Rx2-1 to Rx2-6 are separately driven.

Figure 10:
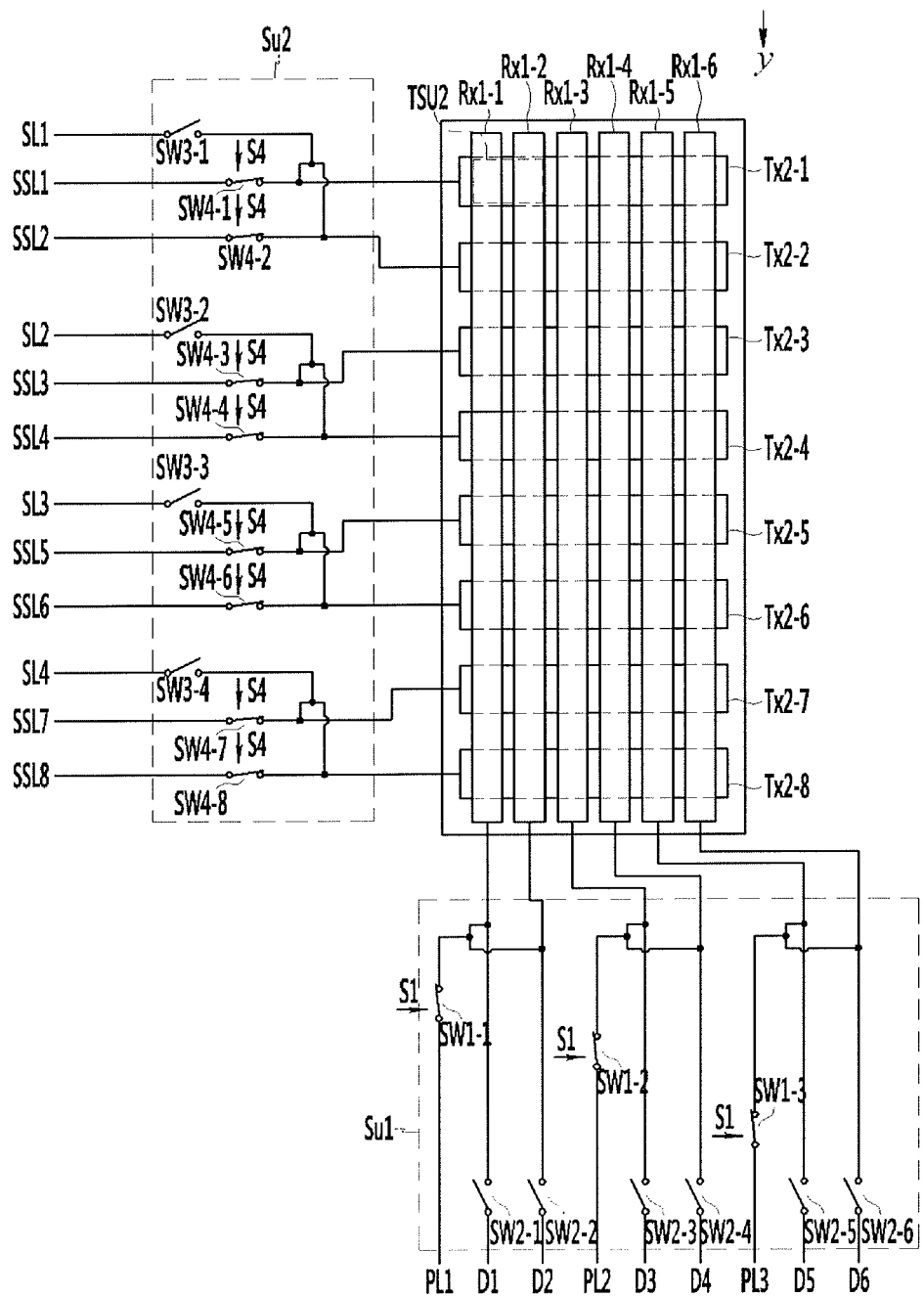
FIG. 10 illustrates an example of the display panel in another stretched state.

FIG. 10 illustrates the display panel 100, the first switch unit Su1, and the second switch unit Su2 in a state where the display panel 100 is stretched in the vertical direction. Sensing input electrodes Tx2-1 to Tx2-8 stretch in the second direction (y direction) as the display device stretches in the second direction (y direction) by a predetermined length. A touch sensing area TSU2 including a sensing capacitor may be formed at a dotted-line portion where two sensing output electrodes Rx1-1 and Rx1-2 and one sensing input electrode Tx2-1 overlap with each other.

The signal controller 200 determines that the display panel 100 stretches in the second direction (y direction) by a predetermined length to generate a smart fluid driving control signal CONT3 so that the smart fluid panel 110 has a rigid property.

The SP driver 500 applies to the second fluid driving voltage FV2 according to the smart fluid driving control signal CONT3 to the smart fluid panel 110 to allow the smart fluid panel 110 to have a rigid property.

In the first switch unit Su1, when the first switches Sw1-1 to Sw1-3 are turned on according to the first switch control signal S2, respectively, and the first switches Sw1-1 to Sw1-3 are turned on according to the first switch control signal S1, two adjacent sensing output electrodes Rx1-1 and Rx1-2, sensing output electrodes Rx1-3 and Rx1-4, and sensing output electrodes Rx1-5 and Rx1-6 among the sensing output electrodes Rx1-1 to Rx1-6 are connected to the first sensing output signal line PL1, the first sensing output signal line PL2, and the first sensing output signal line PL3, respectively.

In the second switch unit Su2, when the fourth switches Sw4-1 to Sw4-8 are turned on according to the fourth switch control signal S4, respectively, the sensing input electrodes Tx1-1 to Tx1-8 and the second sensing output signal lines SSL1-SSL8 are connected to each other, respectively.

Figure 11:
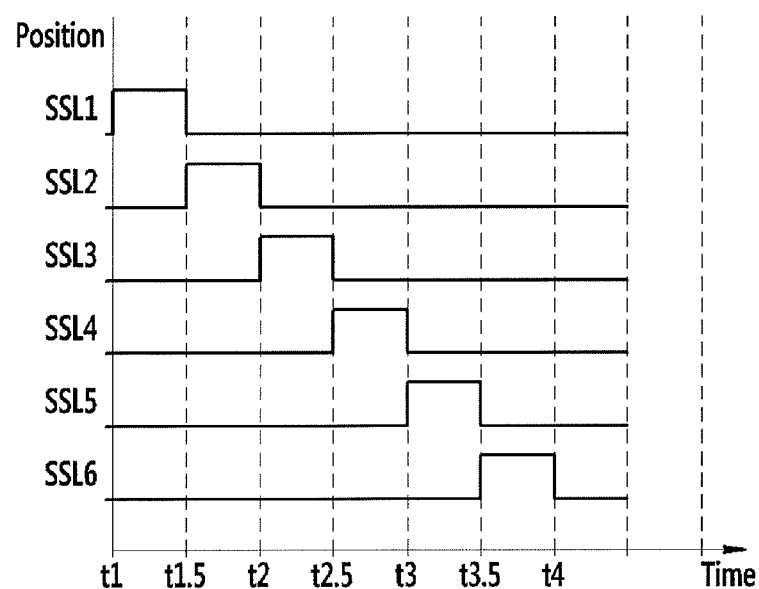
FIGS. 11 and 12 illustrate examples of control signals for the panel in FIG. 10.
Figure 12:
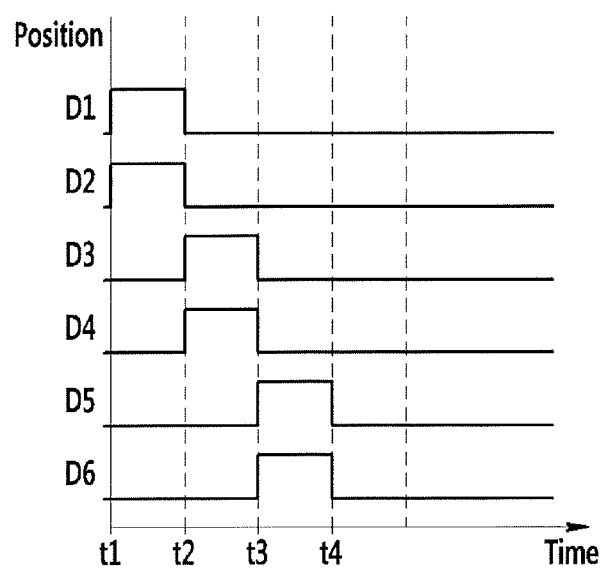

FIGS. 11 and 12 illustrate examples of a sensing input signal and a sensing output signal applied to a sensing input electrode and a sensing output electrode illustrated in FIG. 10, respectively. A sensing operation when the display panel 100 stretches in a vertical direction will be described with reference to FIGS. 11 and 12.

Before time t1, the SP driver 500 applies the second fluid driving voltage FV2 to the smart fluid panel 110 to allow the smart fluid panel 110 to have a rigid property.

At time t1, sensing output signals with the same level are applied to the second sensing output signal lines SPL1 and SPL2. Further, at time t1, the sensing output signal is applied to the second sensing input signal line SSL1.

At time t1.5, the sensing output signal is applied to the second sensing input signal line SSL2.

At time t2, sensing output signals with the same level are applied to the second sensing output signal lines SPL3 and SPL4. Further, at time t2, the sensing output signal is applied to the second sensing input signal line SSL3.

At time t2.5, the sensing output signal is applied to the second sensing input signal line SSL4.

At time t3, sensing output signals with the same level are applied to the second sensing output signal lines SPL5 and SPL6. Further, at time t3, the sensing output signal is applied to the second sensing input signal line SSL5.

At time t3.5, the sensing output signal is applied to the second sensing input signal line SSL6.

Accordingly, when display panel 100 stretches in the second direction (y direction), the stretched sensing input electrodes Tx2-1 to Tx2-8 are separately driven, and two adjacent sensing output electrodes among non-stretched sensing output electrodes Rx1-1 to Rx1-6 are driven as a pair.

An operation in which the display device 1 does not stretch or the stretched length is smaller than a predetermined length will be described. Referring to FIGS. 9 and 12, before time t1, the SP driver 500 applies the first fluid driving voltage FV1 to the smart fluid panel 110 to allow the smart fluid panel 110 to have a flexible property.

At time t1, sensing input signals with the same level are applied to the second sensing input signal lines SSL1 and SSL2. Further, at time t1, sensing output signals with the same level are applied to the second sensing output signal lines SPL1 and SPL2.

At time t2, sensing input signals with the same level are applied to the second sensing input signal lines SSL3 and SSL4. Further, at time t2, sensing output signals with the same level are applied to the second sensing output signal lines SPL3 and SPL4.

At time t3, sensing input signals with the same level are applied to the second sensing input signal lines SSL5 and SSL6. Further, at time t3, sensing output signals with the same level are applied to the second sensing output signal lines SPL5 and SPL6.

Accordingly, when the display device 100 does not stretch or the stretched length is smaller than a predetermined length, two adjacent sensing input electrodes among the non-stretched sensing input electrodes Tx1-1 to Tx1-8 are driven as a pair, and two adjacent sensing output electrodes among the sensing output electrodes Rx1-1 to Rx1-6 are driven as a pair.

Figure 13:
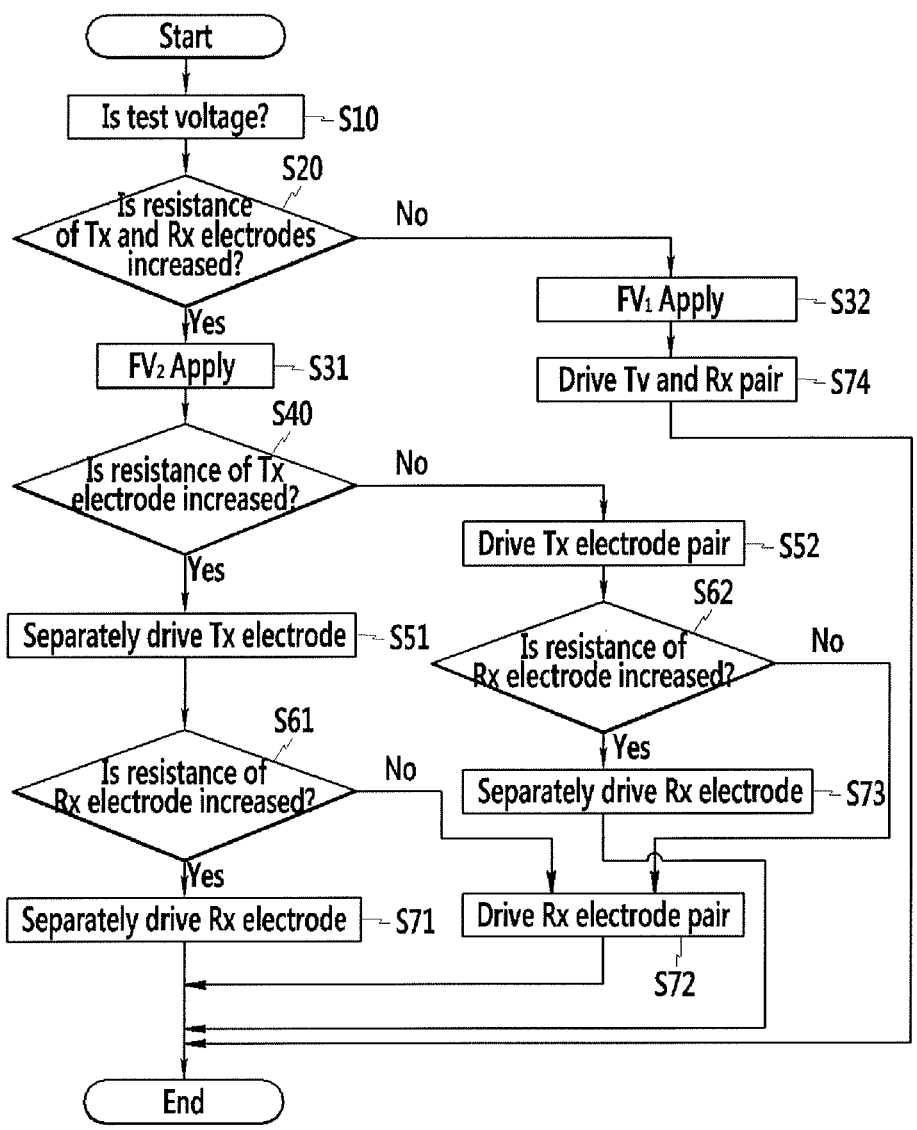
FIG. 13 illustrates an embodiment of a method for driving a display device.

FIG. 13 illustrates an embodiment of a method for driving a display device, which, for example, may be display device 1. In operation S10, a test voltage is applied to a touch electrode, and resistance of a sensing input electrode Tx and a sensing output electrode Rx is calculated.

In operation S20, a degree in which the display panel 100 stretches in a first direction or a second direction is determined.

In operation S31, when the resistance of the sensing input electrode Tx and the sensing output electrode Rx is increased, and the smart fluid panel 110 has a rigid property by applying the second fluid driving voltage FV2 to the smart fluid panel 110.

In operation S32, when the resistance of the sensing input electrode Tx and the sensing output electrode Rx is not increased, and the smart fluid panel 110 has a flexible property by applying the first fluid driving voltage FV1 to the smart fluid panel 110.

In operation S40, it is determined whether the resistance of the sensing input electrode Tx is increased.

In operation S40, when the resistance of the sensing input electrode Tx is increased, the sensing input electrodes Tx are driven as a pair.

In operation S52, when the resistance of the sensing input electrode Tx is increased, the sensing output electrodes Rx are separately driven.

In operation S61, after the sensing output electrodes Rx are separately driven, whether the resistance of the sensing output electrode Rx is increased is determined.

In operation S62, after the sensing input electrodes Tx are separately driven, whether the resistance of the sensing output electrodes Rx is increased is determined.

In operation S71, when the resistance of the sensing output electrodes Rx is increased, the sensing output electrodes Rx are separately driven.

In operation S72, when the resistance of the sensing output electrode Rx is not increased, the sensing input electrodes Tx are separately driven.

In operation S73, when the resistance of the sensing output electrode Rx is increased, the sensing output electrodes Rx are separately driven.

In operation S74, two adjacent sensing input electrodes among the non-stretched sensing input electrodes Tx are driven by a pair, and two adjacent sensing output electrodes among the sensing output electrodes Rx are driven by a pair.

Figure 14:
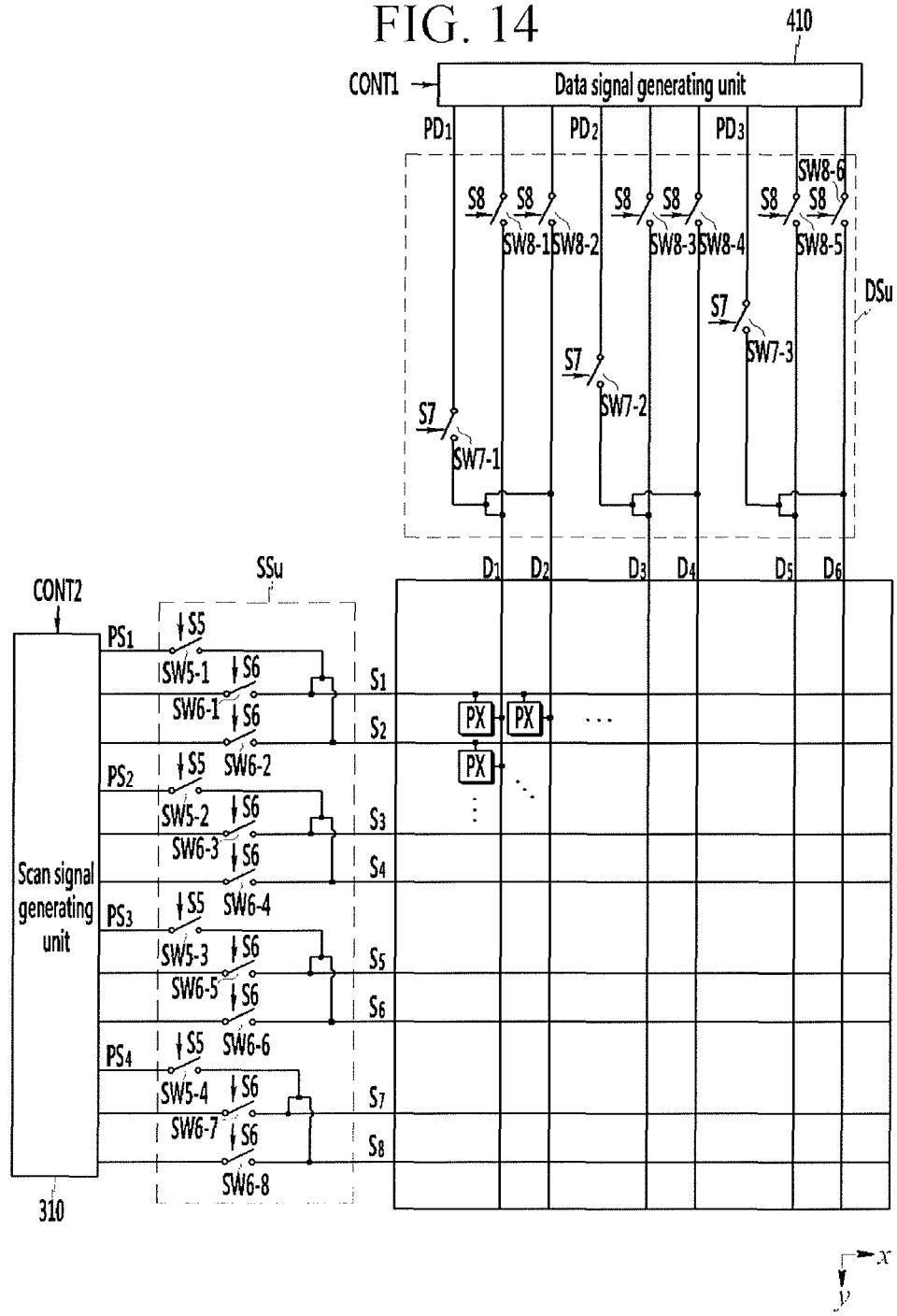
FIG. 14 illustrates an embodiment of a display device.

FIG. 14 illustrates an embodiment of the display device 1. This embodiment is described with reference to FIGS. 1 and 14. For convenience of description, it is illustrated that a matrix of 8×6 pixels PX is included in the display panel 100, but a matrix of a different size may be used in another embodiment.

The signal controller 200 generates a scan switch control signal SSC based on the second stretch signal St2 and generates a data switch control signal DSC according to the first stretch signal St1. A fifth switch control signal S5 and a sixth switch control signal S6 are included in the scan switch control signal SSC. A seventh switch control signal S7 and an eighth switch control signal S8 are included in the data switch control signal DSC.

The display scan driver 300D includes a scan signal generating unit 310 and a scan switch unit SSu formed by a plurality of fifth switches SW5-1 to SW5-4 and a plurality of sixth switches SW6-1 to SW6-8. The scan signal generating unit 310 and the scan switch unit SSu are connected to a plurality of scan lines S1-S8 and a plurality of pair scan lines PS1-PS4.

The scan signal generating unit 310 generates a scan signal according to a display scan control signal CONT2.

The fifth switches SW5-1 to SW5-4 perform a switching operation so that corresponding scan signals are applied to the pair scan lines PS1-PS4 according to a fifth switch control signal S5. The sixth switches SW6-1 to SW6-8 perform a switching operation so that corresponding scan signals are applied to the scan signal lines S1-S8.

The data driver 400 includes a data signal generating unit 410 and a data switch unit DSu formed by a plurality of seventh switches SW7-1 to SW7-3 and a plurality of eighth switches SW8-1 to SW8-6. The data signal generating unit 410 and the data switch unit DSu are connected to a plurality of data lines D1-D6 and a plurality of pair data lines PD1-PD3.

The data signal generating unit 410 generates a data signal according to a data driving control signal CONT1. The seventh switches SW7-1 to SW7-3 perform a switching operation so that corresponding data signals are applied to the pair data lines PD1-PD4 according to a seventh switch control signal S7. The eighth switches SW8-1 to SW8-6 perform a switching operation so that corresponding data signals are applied to the data lines D1-D6.

Figure 15:
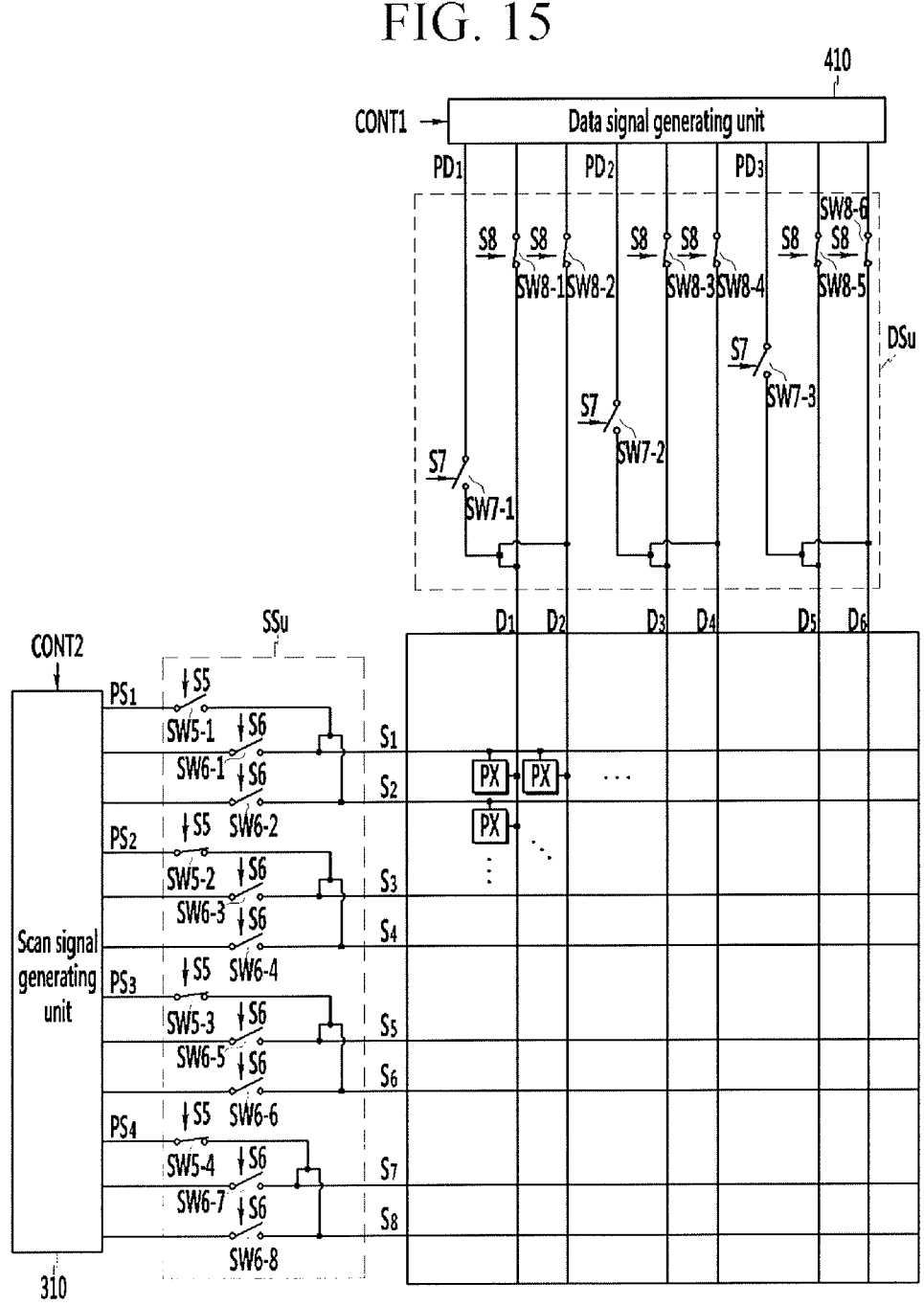
FIG. 15 illustrates an embodiment of a display panel in stretched state.

FIG. 15 illustrates an embodiment of the display panel 100, the scan switch unit SSu, and the data switch unit DSu when the display device 100 stretches in the horizontal direction. Driving of the smart fluid panel 110 may be the same as described with reference to FIG. 7. When the fifth switches Sw5-1 to Sw5-4 are turned on according to the fifth switch control signal S5, respectively, the pair scan lines PS1-Ps4 are connected to the scan signal generating unit 310, respectively. When the eighth switches Sw8-1 to Sw8-6 are turned on according to the eighth switch control signal S8, respectively, the data lines D1-D6 are connected to the data signal generating unit 410, respectively.

Figure 16:
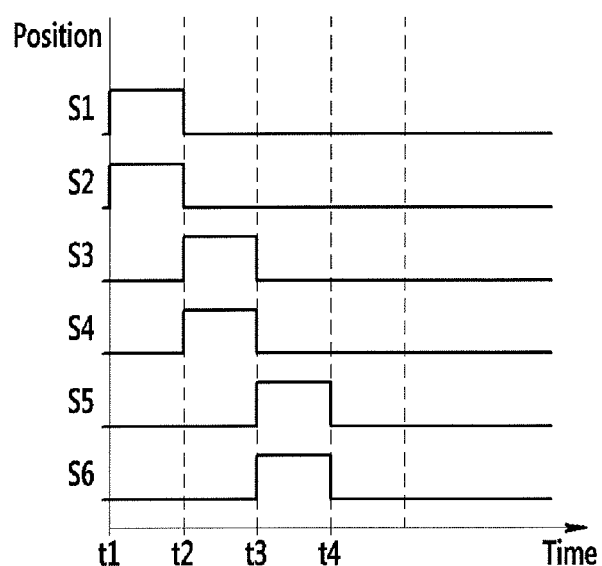
FIGS. 16 and 17 illustrate control signals for the display panel in FIG. 15.
Figure 17:
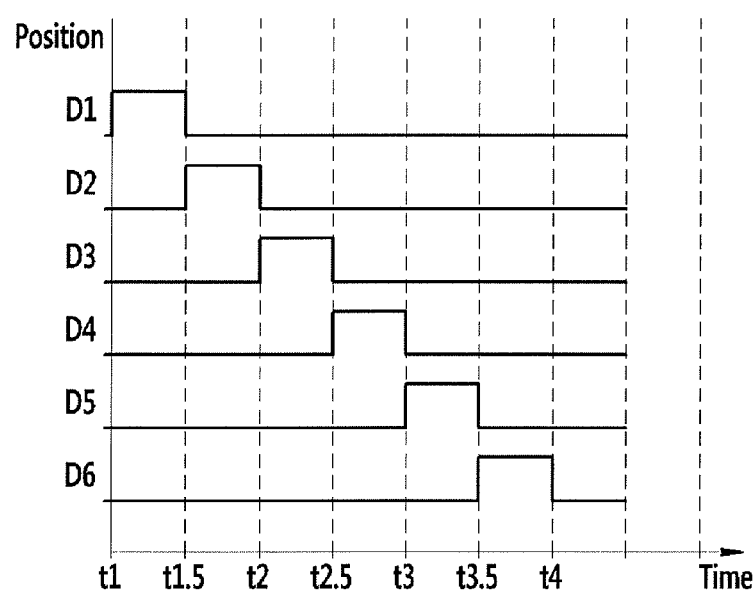

FIGS. 16 and 17 illustrate examples of a scan signal and a data signal respectively applied to a scan line and a data line as illustrated in FIG. 15. A display operation when the display panel 100 stretches in the vertical direction is described with reference to FIGS. 16 and 17. Driving of the smart fluid panel 110 may be the same as described with reference to FIG. 10.

Before time t1, the SP driver 500 applies the second fluid driving voltage FV2 to the smart fluid panel 110 to allow the smart fluid panel 110 to have a rigid property.

Also, at time t1, sensing input signals with the same level are applied to the second sensing input signal lines SSL1 and SSL2. Further, at time t1, the sensing output signal is applied to the second sensing output signal line SPL1.

At time t1.5, the sensing output signal is applied to the second sensing output signal line SPL2.

At time t2, sensing input signals with the same level are applied to the second sensing input signal lines SSL3 and SSL4. Further, at time t2, the sensing output signal is applied to the second sensing output signal line SPL3.

At time t2.5, the sensing output signal is applied to the second sensing output signal line SPL4.

At time t3, sensing input signals with the same level are applied to the second sensing input signal lines SSL5 and SSL6. Further, at time t3, the sensing output signal is applied to the second sensing output signal line SPL5.

At time t3.5, the sensing output signal is applied to the second sensing output signal line SPL6.

Accordingly, when the display panel 100 stretches in the first direction (x direction), two adjacent sensing input electrodes among non-stretched sensing input electrodes Tx1-1 to Tx1-8 are driven as a pair and the stretched sensing output electrodes Rx2-1 to Rx2-6 are separately driven.

Figure 18:
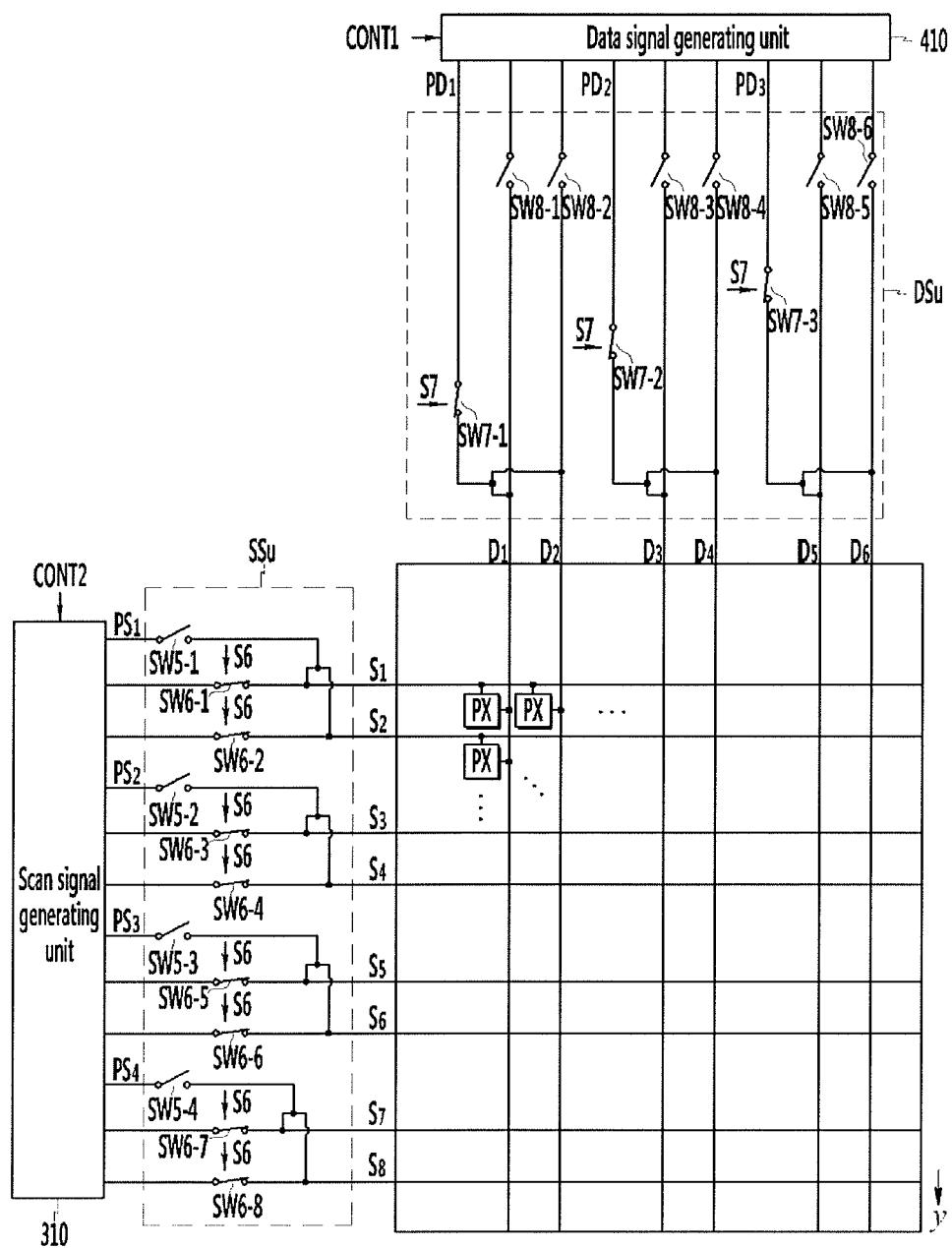
FIG. 18 illustrates an embodiment of the display panel in another stretched state.

FIG. 18 illustrates the display panel 100, the scan switch unit SSu, and the data switch unit DSu when the display device 100 stretches in a vertical direction. When sixth switches Sw6-1 to Sw6-8 are turned on according to a sixth switch control signal S6, respectively, the scan lines S1-S8 are connected to the scan signal generating unit 310, respectively. When seventh switches Sw7-1 to Sw7-3 are turned on according to the seventh switch control signal S7, respectively, the pair data lines PD1-PD3 are connected to the data signal generating unit 410, respectively.

Figure 19:
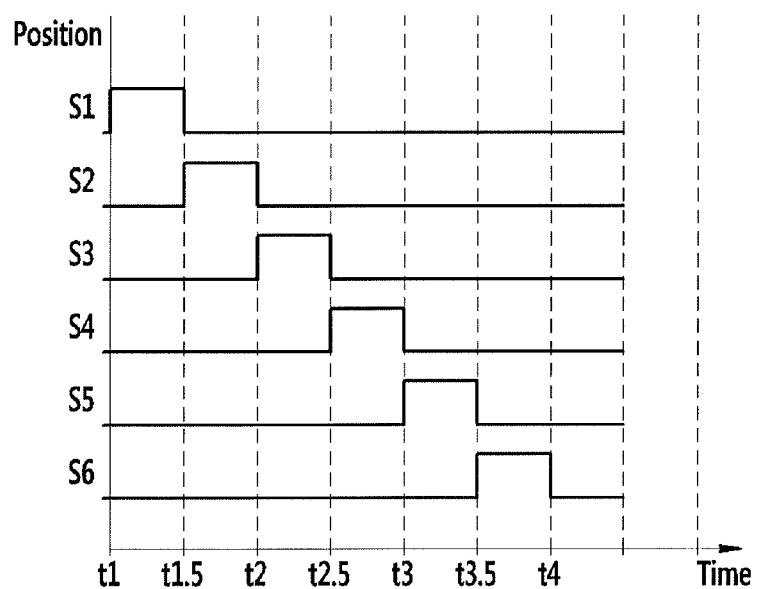
FIGS. 19 and 20 illustrate control signals for the display panel in FIG. 18.
Figure 20:
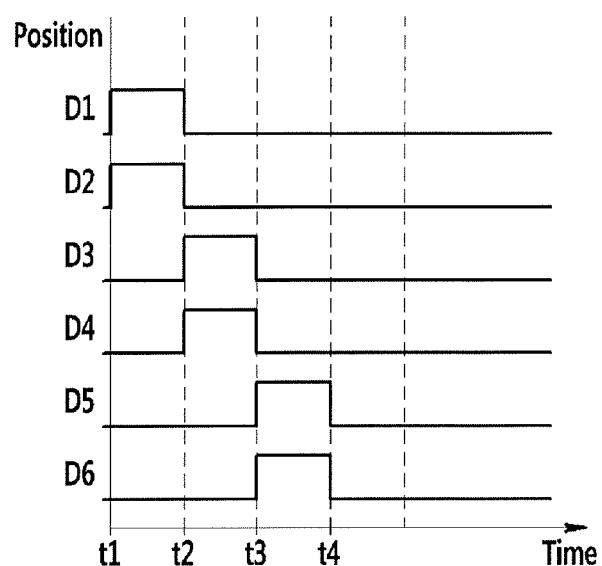

FIGS. 19 and 20 illustrates examples of a scan signal and a data signal respectively applied to the scan line and the data line in FIG. 18. A display operation when the display panel 100 stretches in the vertical direction is described with reference to FIGS. 19 and 20.

Before time t1, the SP driver 500 applies to the second fluid driving voltage FV2 to the smart fluid panel 110 to allow the smart fluid panel 110 to have a rigid property.

At time t1, sensing output signals with the same level are applied to the second sensing output signal lines SPL1 and SPL2. Further, at time t1, the sensing input signal is applied to the second sensing input signal line SSL1.

At time t1.5, the sensing output signal is applied to the second sensing input signal line SSL2.

At time t2, sensing output signals with the same level are applied to the second sensing output signal lines SPL3 and SPL4. Further, at time t2, the sensing output signal is applied to the second sensing input signal line SSL3.

At time t2.5, the sensing output signal is applied to the second sensing input signal line SSL4.

At time t3, sensing output signals with the same level are applied to the second sensing output signal lines SPL5 and SPL6. Further, at time t3, the sensing output signal is applied to the second sensing input signal line SSL5.

At time t3.5, the sensing output signal is applied to the second sensing input signal line SSL6.

Accordingly, when the display panel 100 stretches in the second direction (y direction), the stretched sensing input electrodes Tx2-1 to Tx2-8 are separately driven, and two adjacent sensing output electrodes among non-stretched sensing output electrodes Rx1-1 to Rx1-6 are driven as a pair.

By way of summation and review, when a flexible display stretches, problems may occur, e.g., a malfunction may occur due to a reduction in resolution of the touch sensor. As a result, it may be very difficult to accurately sense a touch under these conditions. In accordance with one or more of the aforementioned embodiments, a display device includes a flexible display panel having a plurality of flexible touch input electrodes arranged in a first direction and a plurality of flexible touch output electrodes arranged in a second direction. A sensing scan driver supplies sensing input signals to the flexible touch input electrodes. A sensing signal processor receives sensing output signals through the flexible touch output electrodes. The display panel is divided into a plurality of touch sensing areas. When the display panel stretches in the first direction by a predetermined first threshold value or more, one touch input electrode and a pair of touch output electrodes correspond to the touch sensing area.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
   a flexible display panel including a plurality of touch input electrodes arranged in a first direction and a plurality of touch output electrodes arranged in a second direction;
   a sensing scan driver to supply a plurality of sensing input signals to the touch input electrodes; and
   a sensing signal processor to receive a plurality of sensing output signals through the touch output electrodes, wherein the flexible display panel includes a plurality of touch sensing areas, and wherein one of the touch input electrodes and a pair of the touch output electrodes adjacent to each other correspond to one of the touch sensing areas by electrically connecting the pair of the touch output electrodes to a single sensing output signal line when the flexible display panel stretches in the first direction by a predetermined first threshold length or more.

2. The display device as claimed in claim 1, wherein one of the touch output electrodes and a pair of the touch input electrodes correspond to one of the touch sensing areas by electrically connecting the pair of the touch input electrodes to a single sensing input signal line when the flexible display panel stretches in the second direction by a predetermined second threshold length or more.

3. The display device as claimed in claim 2, wherein:
the sensing scan driver is to apply a test voltage to the touch input electrodes to generate a first stretch signal, the first stretch signal providing an indication of a change amount of a resistance value of each of the touch input electrodes,
the sensing signal processor is to generate a second stretch signal, the second stretch signal to provide an indication of a change amount of a resistance value of each of the touch output electrodes, and
the display device includes a signal controller to determine lengths to which the flexible display panel stretches in the first direction and the second direction based on the first stretch signal and the second stretch signal.

4. The display device as claimed in claim 3, wherein:
the touch output electrodes include a first touch output electrode and a second touch output electrode, and
the display device includes:
a first sensing output signal line and a second sensing output signal line connected to the first touch output electrode and the second touch output electrode, respectively;
a first switch circuit connected to the first sensing output signal line and the second sensing output signal line, the touch input electrodes including a first touch input electrode and a second touch input electrode,
a first sensing input signal line and a second sensing input signal line connected to the first touch input electrode and the second touch input electrode, respectively; and
a second switch circuit connected to the first sensing input signal line and the second sensing input signal line.

5. The display device as claimed in claim 4, wherein:
the first switch circuit includes:
a third sensing output signal line connecting the first sensing output signal line and the second sensing output signal line;
a first switch connecting the third sensing output signal line; and
a plurality of second switches connecting the first sensing output signal line and the second sensing output signal line, respectively, and
the second switch circuit includes:
a third sensing input signal line connecting the first sensing input signal line and the second sensing input signal line;
a third switch connecting the third sensing input signal line; and
a plurality of fourth switches connecting the first sensing input signal line and the second sensing input signal line, respectively, the first to fourth switches to perform a switching operation according to a switching control signal of the signal controller.

6. The display device as claimed in claim 5, wherein, when the signal controller determines that the flexible display panel stretches in the first direction by less than the first threshold length or stretches in the second direction by less than the second threshold length:
the first switch circuit is to control the switching operation so that the first switch is turned off and the second switches are turned on, and
the second switch circuit is to control the switching operation so that the third switch is turned off and the fourth switches are turned on.

7. The display device as claimed in claim 6, wherein:
the first switch circuit is to apply a sensing output signal to the first sensing output signal line and the second sensing output signal line at a first time, and
the second switch circuit is to apply a sensing input signal to the first sensing input signal line and the second sensing input signal line at the first time.

8. The display device as claimed in claim 5, wherein, when the signal controller determines that the flexible display panel stretches in the first direction by the first threshold length or more:
the first switch circuit is to control the switching operation so that the first switch is turned off and the second switches are turned on, and
the second switch circuit is to control the switching operation so that the third switch is turned on and the fourth switches are turned off.

9. The display device as claimed in claim 8, wherein:
the first switch circuit is to apply a sensing output signal to the first sensing output signal line at a first time and the sensing output signal to the second sensing output signal line at a second time, and
the second switch circuit is to apply a sensing input signal to the first sensing input signal line and the second sensing input signal line at the first time.

10. The display device as claimed in claim 5, wherein, when the signal controller determines that the flexible display panel stretches in the second direction by the second threshold length or more:
the first switch circuit is to control the switching operation so that the first switch is turned off and the second switches are turned on, and
the second switch circuit is to control the switching operation so that the third switch is turned on and the fourth switches are turned off.

11. The display device as claimed in claim 10, wherein:
the first switch circuit is to apply a sensing output signal to the first sensing output signal line and the second sensing output signal line at a first time, and
the second switch circuit is to apply a sensing input signal to the first sensing input signal line at the first time and the sensing input signal to the second sensing input signal line at a second time.

12. The display device as claimed in claim 5, wherein, when the signal controller determines that the flexible display panel stretches in the first direction and the second direction by the first threshold length and the second threshold length or more, respectively:
the first switch circuit is to control the switching operation so that the first switch is turned on and the second switches are turned off, and is to apply a sensing output signal to the first sensing output signal line at a first time and the sensing output signal to the second sensing output signal line at a second time, and
the second switch circuit is to control the switching operation so that the third switch is turned on and the fourth switches are turned off, and is to apply a sensing input signal to the first sensing input signal line at the first time and the sensing input signal to the second sensing input signal line at a second time.

13. The display device as claimed in claim 2, further comprising:
a first pixel connected to a first scan line and a first data line;

a second pixel connected to a second scan line and a second data line;
a display scan driver to apply corresponding scan signals to the first scan line and the second scan line; and
a data driver to apply corresponding data signals to the first data line and the second data line, wherein:
when the flexible display panel stretches in the first direction by the first threshold length or more, the display scan driver is to apply a same scan signal to the first scan line and the second scan line,
when the flexible display panel stretches in the second direction by the second threshold length or more, the data driver is to apply a same data signal to the first data line and the second data line.

14. A method for driving a display device, including a flexible display panel including a plurality of touch sensing areas, a plurality of touch input electrodes arranged in a first direction and a plurality of touch output electrodes arranged in a second direction, a sensing scan driver supplying a plurality of sensing input signals to the plurality of touch input electrodes, a sensing signal processor receiving a plurality of sensing output signals through the plurality of touch output electrodes, and a signal controller, the flexible display panel divided into a plurality of touch sensing areas, and when the flexible display panel stretches in the first direction by a predetermined first threshold value or more, one touch input electrode and a pair of touch output electrodes correspond to one of the touch sensing areas, the method comprising:
applying a test voltage to the touch input electrodes to generate a first stretch signal providing an indication of a change amount of a resistance value of each of the touch input electrodes;
applying a test voltage for generating a second stretch signal providing an indication of a change amount of a resistance value of each of the touch output electrodes; and
determining lengths to which the flexible display panel stretches in the first direction and the second direction based on the first stretch signal and the second stretch signal.

15. The method as claimed in claim 14, wherein:
one of the pair of touch output electrodes and a pair of touch input electrodes correspond to one of the touch sensing areas when the flexible display panel stretches in a second direction by a predetermined second threshold value or more.

16. The method as claimed in claim 14, wherein:
the touch output electrodes includes a first touch output electrode and a second touch output electrode,
the display device includes a first sensing output signal line and a second sensing output signal line connected to the first touch output electrode and the second touch output electrode, respectively, and a first switch circuit connected to the first sensing output signal line and the second sensing output signal line,
the touch input electrodes includes a first touch input electrode and a second touch input electrode,
the display device includes a first sensing input signal line and a second sensing input signal line connected to the first touch input electrode and the second touch input electrode, respectively; and a second switch circuit connected to the first sensing input signal line and the second sensing input signal line.

17. The method as claimed in claim 16, wherein:
the first switch circuit includes a third sensing output signal line connecting the first sensing output signal line and the second sensing output signal line, a first switch connecting the third sensing output signal line, and a plurality of second switches connecting the first sensing output signal line and the second sensing output signal line, respectively, and
the second switch circuit includes a third sensing input signal line connecting the first sensing input signal line and the second sensing input signal line, a third switch connecting the third sensing input signal line, and a plurality of fourth switches connecting the first sensing input signal line and the second sensing input signal line, respectively, the first to fourth switches perform a switching operation according to a switching control signal of the signal controller.

18. The method as claimed in claim 17, further comprising:
when the flexible display panel does not stretch or stretches in a first direction or a second direction by less than a predetermined length, the switching operation includes:
controlling the switching operation so that the first switch is turned off and the second switches are turned on; and
controlling the switching operation so that the third switch is turned off and the fourth switches are turned on.

19. The method as claimed in claim 18, further comprising:
applying a sensing output signal to the first sensing output signal line and the second sensing output signal line at a first time; and
applying a sensing input signal to the first sensing input signal line and the second sensing input signal line at the first time.

20. The method as claimed in claim 17, wherein:
when the flexible display panel stretches in the first direction by a predetermined length, the switching operation includes controlling the switching operation so that the first switch is turned off and the second switches are turned on and controlling the switching operation so that the third switch is turned on and the fourth switches are turned off, and
when the flexible display panel stretches in the second direction by the predetermined length, the switching operation includes controlling the switching operation so that the first switch is turned off and the second switches are turned on and controlling the switching operation so that the third switch is turned on and the fourth switches are turned off.

21. The method as claimed in claim 16, wherein the display device includes:
a first pixel connected to a first scan line and a first data line;
a second pixel connected to a second scan line and a second data line;
a scan driver to apply corresponding scan signals to the first scan line and the second scan line, and a data driver to apply corresponding data signals to the first data line and the second data line, wherein the method includes:
when the flexible display panel stretches in the first direction by the first threshold value or more, applying a same scan signal from the scan driver to the first scan line and the second scan line; and
when the flexible display panel stretches in the second direction by a second threshold value or more, applying a same data signal from the data driver to the first data line and the second data line.

* * * * *